(12) United States Patent
Jo

(10) Patent No.: US 11,269,486 B2
(45) Date of Patent: Mar. 8, 2022

(54) METHOD FOR DISPLAYING ITEM IN TERMINAL AND TERMINAL USING THE SAME

(71) Applicant: Samsung Electronics Co. Ltd., Suwon-si (KR)

(72) Inventor: Chanki Jo, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 13/904,595

(22) Filed: May 29, 2013

(65) Prior Publication Data

US 2013/0326421 A1 Dec. 5, 2013

(30) Foreign Application Priority Data

May 29, 2012 (KR) .................. 10-2012-0056770
Apr. 4, 2013 (KR) .................. 10-2013-0036955

(51) Int. Cl.
  *G06F 3/0482* (2013.01)
  *G06F 3/0488* (2013.01)
  *G06F 3/04883* (2022.01)

(52) U.S. Cl.
  CPC ........ *G06F 3/0482* (2013.01); *G06F 3/04883* (2013.01)

(58) Field of Classification Search
  CPC .................. G06F 3/0482; G06F 3/04883
  See application file for complete search history.

(56) References Cited

U.S. PATENT DOCUMENTS

| 6,940,494 | B2 * | 9/2005 | Hoshino ................. G06F 3/016 178/18.01 |
| 7,158,123 | B2 | 1/2007 | Myers et al. |
| 8,539,375 | B1 * | 9/2013 | Thorsander et al. ......... 715/821 |
| 8,788,979 | B2 * | 7/2014 | Osman et al. ................ 715/863 |
| 2003/0098891 | A1 | 5/2003 | Molander |
| 2007/0157125 | A1 * | 7/2007 | Peters .......................... 715/837 |
| 2007/0250793 | A1 * | 10/2007 | Miura et al. .................. 715/810 |
| 2008/0074399 | A1 | 3/2008 | Lee |
| 2008/0122796 | A1 | 5/2008 | Jobs et al. |
| 2009/0125845 | A1 * | 5/2009 | Lacock et al. ................ 715/841 |
| 2009/0128505 | A1 * | 5/2009 | Partridge et al. ............. 345/173 |

(Continued)

FOREIGN PATENT DOCUMENTS

| EP | 1 369 770 A1 | 12/2003 |
| EP | 2 116 927 A2 | 11/2009 |

(Continued)

OTHER PUBLICATIONS

Swenson; My favorite ways to use Windows Touch; http://windows.microsoft.com; Jan. 14, 2010; pp. 2-12; XP055015284; URL:http://web.archive.org/web/20100114145830/http://windows.microsoft.com/en-us/windows7/my-favorite-ways-to-use-touch.

(Continued)

*Primary Examiner* — Andrew T Chiusano
(74) *Attorney, Agent, or Firm* — Jefferson IP Law, LLP

(57) ABSTRACT

A method for displaying a sub menu in a terminal and a terminal using the same is provided. The method includes displaying an item and a corresponding indicator for the item, receiving a touch input selecting the item according to the indicator, and displaying a related item to the item when receiving a touch gesture consecutive to the touch input.

28 Claims, 28 Drawing Sheets

(56) References Cited

U.S. PATENT DOCUMENTS

| | | | |
|---|---|---|---|
| 2009/0228820 A1 | 9/2009 | Kim et al. | |
| 2009/0282360 A1 | 11/2009 | Park et al. | |
| 2009/0288044 A1 | 11/2009 | Matthews et al. | |
| 2009/0327963 A1* | 12/2009 | Mouilleseaux et al. | 715/834 |
| 2010/0042951 A1 | 2/2010 | Ogren | |
| 2010/0318941 A1* | 12/2010 | Yamada et al. | 715/835 |
| 2011/0029920 A1* | 2/2011 | Kang | 715/810 |
| 2011/0219332 A1 | 9/2011 | Park | |
| 2011/0279388 A1* | 11/2011 | Jung | G06F 3/04883 345/173 |
| 2012/0060111 A1 | 3/2012 | Kim | |
| 2012/0072867 A1* | 3/2012 | Schlegel | 715/808 |
| 2012/0159398 A1* | 6/2012 | Kurosawa et al. | 715/841 |
| 2012/0162112 A1* | 6/2012 | Cho | 345/173 |
| 2013/0061172 A1* | 3/2013 | Huang | G06F 3/04817 715/808 |
| 2013/0063364 A1* | 3/2013 | Moore | G06F 3/0416 345/173 |
| 2013/0246970 A1* | 9/2013 | Helle | G06F 3/0482 715/822 |
| 2014/0068516 A1* | 3/2014 | Escobedo | G06F 3/04817 715/835 |
| 2014/0282254 A1* | 9/2014 | Feiereisen et al. | 715/835 |

FOREIGN PATENT DOCUMENTS

| | | |
|---|---|---|
| JP | 09-016362 A | 1/1997 |
| JP | 2000-244903 A | 9/2000 |
| KR | 10-2005-0008800 A | 1/2005 |
| KR | 10-2006-0009706 A | 2/2006 |
| KR | 10-2009-0030015 A | 3/2009 |
| KR | 10-1012300 | 2/2011 |
| KR | 10-2012-0006403 A | 1/2012 |
| WO | 2008/030976 A2 | 3/2008 |

OTHER PUBLICATIONS

Vasudev; 9 Touch Gestures in Windows 7 for Multi-touch Magic; Oct. 14, 2009; XP055341965; URL:https://winliveviews.wordpress.com/2009/10/14/9-touch-gestures-in-windows-7-for-multi-touch-magic/.

European Office Action dated Apr. 28, 2021, issued in European Application No. 13169777.3.

European Office Action dated Feb. 5, 2020, issued in European Application No. 13169777.3-1216.

Oral Proceedings dated Jan. 19, 2022, issued in European Application No. 13 169 777.3.

* cited by examiner

10

METHOD FOR DISPLAYING ITEM IN TERMINAL AND TERMINAL USING THE SAME

PRIORITY

This application claims the benefit under 35 U.S.C. 119(a) of a Korean patent application filed on May 29, 2012 in the Korean Intellectual Property Office and assigned Serial No. 10-2012-0056770, and a Korean patent application filed on Apr. 4, 2013 and assigned Serial No. 10-2013-0036955, the entire disclosures of which are hereby incorporated by reference.

BACKGROUND OF THE INVENTION

1. Field of the Invention

The present invention relates to a method for displaying an item in a terminal and a terminal using the same. More particularly, the present invention relates to a method for displaying an arbitrary item and a related item for the item in a terminal including a touch screen or a touch pad, and a terminal using the same.

2. Description of the Related Art

In an existing graphic user interface that uses a traditional input scheme, such as a mouse and a keyboard, it has been easier to select a content displayed on a screen and variously provide a method for displaying a menu or sub menu of the selected content.

As a representative example, there is Microsoft's WINDOWS operating system that belongs to a traditional Graphical User Interface (GUI) environment. Here, when an icon displayed on the screen is selected, a function linked to the corresponding icon is immediately executed by double clicking a first mouse button, and a menu on the subject of the corresponding icon may be displayed in a pop-up menu form by clicking a second mouse button. In the User Interface (UI) under an existing Personal Computer (PC) operating system, other preset operations are mapped to individual keys (or buttons) of a device having a plurality of input keys, such as the mouse and the keyboard, such that even though the same content is selected, it is possible to display different results depending on which key (or button) is used.

However, in the terminal using a touch screen or a touch pad, an input is recognized by using the contact of an object such as a finger or a stylus pen. Accordingly, it is difficult to apply the various selection methods using the plurality of input buttons of the traditional GUI environment that uses the mouse or the keyboard. Therefore, the touch screen causes an inconvenience in that it must process several steps of screen switching to display the sub menu of a specific content.

FIG. 1 is a diagram illustrating a user interface on which a new arrival message notification is displayed according to the related art.

Referring to FIG. 1, when there is a new arrival message, the number of new arrival messages is displayed on the message box icon 10. In this case, in order to delete such a notification display, the message box function must be executed to enter into the corresponding menu.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for displaying an item in a terminal device and a terminal device using the same capable of checking a related item for a specific item without requiring a separate screen switching by using a touch gesture which is sequentially input when the specific item includes a related item.

Another aspect of the present invention is to provide a method for displaying an item capable of improving a user's convenience and maneuverability by displaying a related item indicator to enable the user to intuitively perform a touch gesture corresponding to the indicator when the item includes a related item.

In accordance with an aspect of the present invention, a method for displaying items in a terminal comprising a touch screen is provided. The method includes displaying an item and a corresponding indicator for the item, receiving a touch input selecting the item according to the indicator, and displaying a related item to the item when receiving a touch gesture consecutive to the touch input.

In accordance with another aspect of the present invention, a terminal is provided. The terminal includes a display unit for displaying an item and an indicator for the item, an input unit for receiving an input, and a controller for controlling to display a related item to the item when receiving a touch input selecting the item and a touch gesture consecutive to the touch input.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For reference, the term "the item" as used in this document is a concept including an icon or individual contents on a list, and means that a command that a user provides to a computer in order to execute any function is indicated as a text or an image.

A "related item" may refer to an item for executing a detailed function for a specific item, or a sub menu for the specific item.

In an exemplary embodiment of the present invention which will be described later, for convenience of illustration, it is assumed that the related item is a sub menu for a specific item. However, it should be noted that the related item is not necessarily limited to the sub menu, but can be another function, for example, a menu for executing a detailed function for a specific item as described above.

The "related item indicator," which is an indicator indicating whether the related item for a specific item exists, means an index of a shape capable of enabling a user to recognize a sign, a figure, text, and the like. The terms "related item indicator" and "sub menu indicator" as used in this document can be selectively used with the same meaning.

Figure 1:
FIG. 1 is a diagram illustrating a user interface on which a new arrival message notification is displayed according to the related art.
Figure 2:
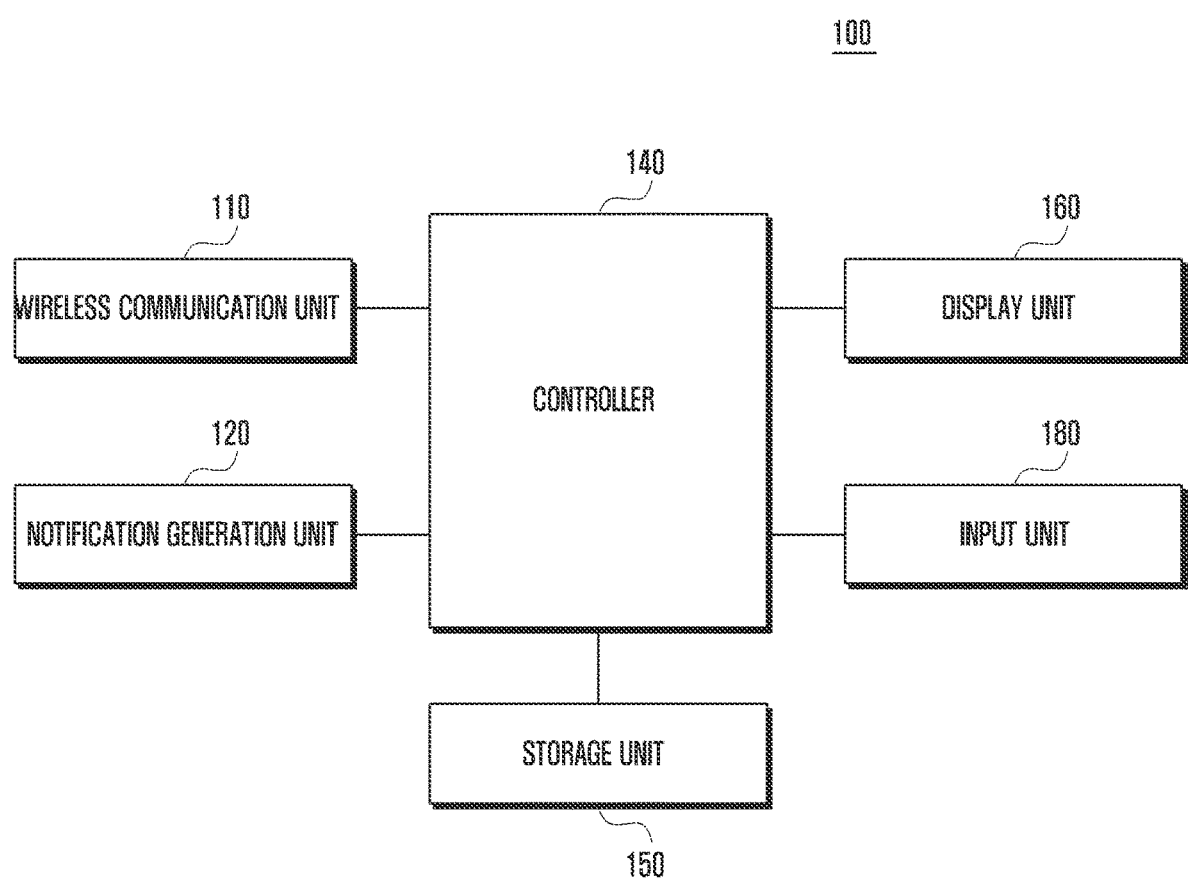
FIG. 2 is a block diagram for describing a detailed configuration of a terminal according to an exemplary embodiment of the present invention.

Hereinafter, a terminal according to an exemplary embodiment of the present invention will be described with reference to FIG. 2. FIG. 2 is a block diagram for illustrating a detailed configuration of a terminal according to an exemplary embodiment of the present invention.

Referring to FIG. 2, the terminal device 100 according to the exemplary embodiment of the present invention may include a wireless communication unit 110, a notification generation unit 120, a controller 140, storage 150, a display unit 160, and an input unit 180.

The wireless communication unit 110 executes a function of transmitting and receiving of corresponding data for wireless communication of the terminal 100. The wireless communication unit 110 may include a Radio Frequency (RF) transmitter for up-converting and amplifying the frequency of a transmission signal, and an RF receiver for low-noise amplifying and down-converting the frequency of a reception signal. In addition, the wireless communication unit 110 receives data and outputs the received data to the controller 140, and transmits data outputted from the controller 140, through a radio channel.

The notification generation unit 120 may include a speaker outputting a sound signal, an actuator generating a vibration, and a light emitting device such as a Light Emitting Diode (LED) generating light. The notification generation unit 120 outputs the sound signal or generates the vibration or light when a sub menu is displayed to inform the user that the sub menu is displayed.

The controller 140 controls the overall operation of each component of the terminal 100. Particularly, the controller 140 may control a series of processes by which the terminal 100 displays an item and a related item for the displayed item (for example, a sub menu). When the item corresponding to an arbitrary function is displayed on the display unit 160, the controller 140 determines whether the item includes at least one sub menu associated with the item. As described above, the item may include the icon or individual contents on a list.

When the item includes the sub menu, the controller 140 displays the sub menu indicator outside or inside the item. If the item does not include the sub menu, the controller 140 may not display the indicator on the display unit 160 separately.

When processing the user input, if the item includes the sub menu, the controller 140 determines whether the touch gesture is continuously sensed for at least a predetermined period of time after initially sensing the touch input. When the touch gesture is so continuously sensed, the controller 140 may control to display the sub menu for the item. On the other hand, when the touch gesture is not continuously sensed for the predetermined period of time, the controller 140 may control to execute a function corresponding to the item. Moreover, when processing the user input, if the item does not include a sub menu, the controller 140 may control to immediately execute a function corresponding to the item when initially sensing the touch input. In this case, it should be noted that the case of the item including the sub menu is different from the case of determining whether the touch gesture is continuously sensed after sensing the touch input.

In the meantime, as another example, when the item does not include the sub menu, the sub menu indicator may be displayed, but, in this case, preferably, a shape of the sub menu indicator may indicate that the item does not include the sub menu. Hereinafter, it will be described that, when the item includes the sub menu, the controller 140 displays the sub menu indicator on the item.

The controller 140 may receive a first input for selecting the item on which the sub menu indicator is displayed from the input unit 180, and may receive a second input for displaying the sub menu from the input unit 180 after receiving the first input. As described above, when the first input and the second input are continuously received for the predetermined period of time, the controller 140 may control the display unit 160 to display the sub menu. Here, the first input may be a touch input and the second input may include any of a sweep, a drag, a double tab including the first input, a long tap, a press, a long press, and a touch gesture including gestures spacing multitouch points from each other.

Here, the touch means that the user touches by using a touch input means such as a finger or a stylus pen at any one point of the display unit 160. A sweep is a concept similar to a flick, and means that the touch input means is rapidly moved like bouncing on the screen during the movement and is then lifted off. The drag moves the touch input means in arbitrary direction in a state in which the user touches an arbitrary point of the display unit 160. The tap is an operation that lifts the touch at a corresponding point, without moving the touch input means after touching the arbitrary point. The double tap means that the tap operation is quickly repeated, such that a tap occurs two times within a short predetermined period of time. When the second input is the tap, the controller 140 recognizes the tap gesture which is performed immediately after the first tap input as the double tap. The long tap is an operation that lifts the touch in the corresponding point without moving the touch input means, after maintaining the touch for a preset time or more. The press applies a pressure at an arbitrary point by the touch input means. The long press maintains the press operation during preset time or more, which may be the same as the preset time of the long tap. The input unit 180 includes a pressure sensor to sense the pressure at the touched point, such that the controller 140 may distinguish between the touch and the press based on the sensed pressure information.

As described above, there are various kinds of second inputs for displaying the sub menu. However, only when the gesture corresponding to the sub menu indicator displayed on the item is inputted, the controller 140 recognizes the gesture as the second input to display the sub menu. In addition, a shape of the indicator may indicate a kind of the second input, and a direction of the indicator may indicate a moving direction of the second input. In this case, the controller 140 displays the sub menu indicator corresponding to the second input on the sub menu, thereby assisting the user to intuitively perform a touch gesture.

In the meantime, according to another exemplary embodiment of the present invention, a direction of the indicator may indicate a direction in which a sub menu related to an item is output (deployed) when displayed.

A detailed description of the touch gesture, and an output direction of a sub menu of the second input corresponding to the shape and direction of the sub menu indicator, will be described below with reference to accompanying drawings.

In displaying the sub menu, when the second input for displaying the sub menu is received, the controller 140 may display the sub menu in such a manner that the sub menu is spread out, for example, expanded, while concurrently being slid according to the moving direction of the second input. In this case, the controller 140 may control to display a sub menu display area separately, and to display a sub menu in the sub menu display area. At this time, the controller 140 may control to display the sub menu based on the position of selected item.

In this case, according to an exemplary embodiment of the present invention, the controller 140 controls the transparency of a related item display area so that the related item display area overlaps a current display screen. Furthermore, according to another exemplary embodiment of the present invention, the controller 140 controls to reduce, with a given ratio, the display screen that the terminal is displaying, as much as an area the related item display area is displayed.

In this case, the controller may control to display contents related to the function which is being executed in the terminal in an area in which the related item is not displayed among the display area of terminal.

In the meantime, when the sub menu which is spread out and slid reaches a boundary of the screen, the controller 140 may then move the sub menu in an opposite direction to the moving direction of the second input so that all of sub menus are displayed on a screen. When a region from a sliding start point to the boundary of the screen is not sufficient to display all of related sub menus, if the sub menus are displayed by the above-mentioned scheme, it is possible to obtain the same effect as an effect that the sub menu bounces off the boundary of the screen to enter into the inside area of the screen while being spread, so that a more dynamic screen can thus be implemented.

In addition, the controller 140 may control the notification generation unit 120 to generate at least one of a sound, a vibration, and a light when the sub menu is displayed. This is to alert the user that the sub menu is displayed. For reference, the sub menu may be displayed in any of a text format, an icon format, a picture format, an animation clip format, or a video format.

If the second input for displaying the sub menu is not received after receiving the first input, the controller 140 may execute a function corresponding to the sub menu selected by the first input. According to the exemplary embodiment of the present invention, while a scheme according to the related art is maintained to execute the function corresponding to a specific sub menu, the sub menu according to an exemplary embodiment of the present invention can be displayed in the same screen.

When the user selects one of the displayed items, the controller 140 executes the item function, and switches the displayed item into the sub menu corresponding to a selected item to display the switched sub menu. At this time, the sub menu corresponding to the selected item may be a sub menu representing the selected item itself, or a sub menu reflecting a result obtained by executing the function of the selected item.

When the sub menu includes individual contents on a list, a gesture such as the sweep or the flick may be used in order to scroll through the list entries beyond the range of the screen. Therefore, a gesture input specialized for the list (e.g., scrolling) and a gesture input for displaying the sub menu need to be distinguished from each other. Hereinafter, an operation of the controller 140 for distinguishing two inputs will be described. The controller 140 may display the sub menu indicator in the inside of the individual contents when the sub menu is the individual contents on the list.

With the individual contents on the displayed list, the controller 140 receives a third input for selecting a preset area including the sub menu indicator, and displays the sub menu when receiving the second input after receiving the third input. When the second input is not received after receiving the third input, the controller 140 executes the function of the individual contents. When the third input is not received in spite of the presence of the input, that is, the sub menu area except for the preset area is selected, the controller 140 may execute the scroll function according to the input of the sweep gesture. In other words, when the preset area including the sub menu indicator is selected, the controller 140 displays the sub menu in response to the continuously inputted gesture. When an area in which the preset area is excluded from the sub menu is selected, the controller 140 executes the function related to list such as the scrolling in response to the continuously inputted gesture.

The storage 150 serves to store a program and data for operating the terminal 100, and may be divided into a program area and a data area. The program area may include a program controlling the overall operation of the terminal 100, an Operating System (OS) for booting the terminal 100, an application program required for multimedia content play, and an application program required for other optional functions of the terminal 100, for example, a camera function, a sound play function, and an image or a video play function.

In relation with the sub menu display, the storage unit 150 may store information such as a condition in which the sub menu is displayed, a content of the sub menu, and a connection target, according to the condition. The data area, which stores data generated according to the use of the terminal 100, may store, for example, the image, the video, a phone book, and audio data.

The display unit 160 may be formed of a Liquid Crystal Display (LCD), an Organic Light Emitting Diode (OLED), an Active Matrix Organic Light Emitting Diode (AMO-LED), etc., and visually provides the menu of the terminal 100, the inputted data, function setting information, and other various information to the user. The display unit 160 displays the item corresponding to the arbitrary function and displays the sub menu under the control of the controller 140. In addition, the display unit 160 performs the function of outputting a boot screen, a standby screen, the menu screen, a telephony screen, and other application screens of the terminal 100.

The input unit 180 senses the touch input of the user. The input unit 180 may be configured with a touch sensing sensor such as a capacitive overlay, a resistive overlay, an infrared beam, or a pressure sensor. The input unit 180 may be configured of all kinds of sensor devices capable of sensing the contact or pressure of an object in addition to the sensors.

The input unit 180 senses the touch input of the user and generates a sensing signal to transmit to the controller 140. Coordinates data of the user's touch input is included in the sensing signal. When the user inputs the operation for moving the touch position, such as a touch and drag input or a flick input, the input unit 180 generates the sensing signal including the coordinate data of a moving route of the touch position to transmit the sensing signal to the controller 160.

Particularly, the input unit 180 may sense the selection input (a first input or a third input) of the item or a second input to display the sub menu according to an exemplary embodiment of the present invention. A touch (including a multi-touch), a sweep, and the like may be illustrated as an example of the user input, and as each input gesture is described above, a description thereof is omitted.

When the terminal of the present invention includes the touch screen, the display unit 160 and the input unit 180 are included and may serve to perform each function on the touch screen. In addition, when the terminal includes the touch pad, the touch pad may be used as the input unit 180.

Figure 3:
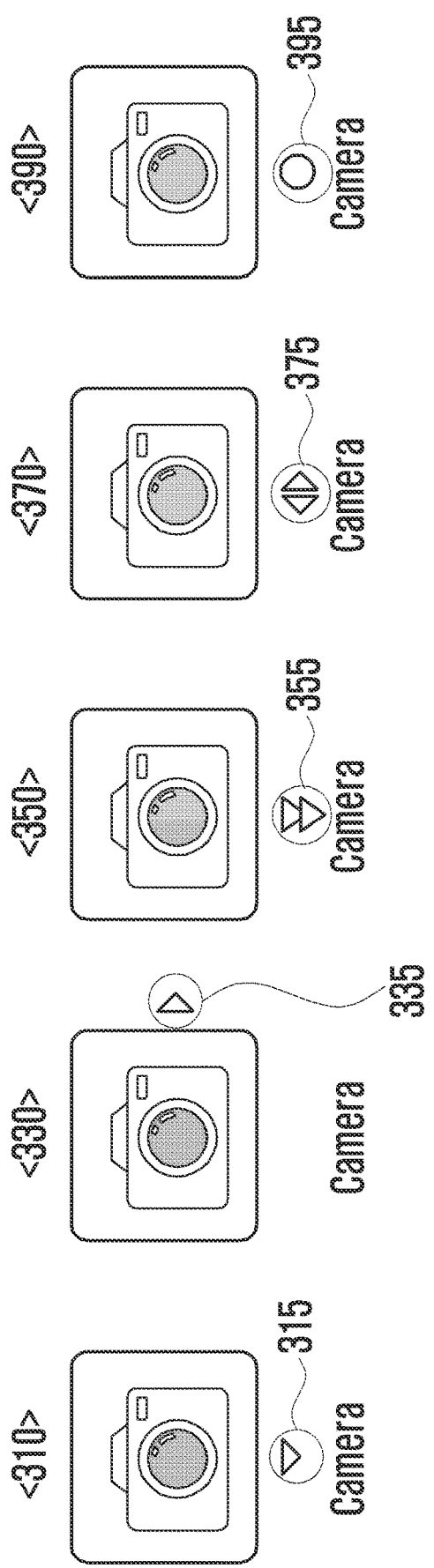
FIG. 3 is a diagram illustrating an example of a case in which a sub menu indicator is displayed in an icon according to an exemplary embodiment of the present invention.

FIG. 3 is a diagram illustrating an example of a case in which a sub menu indicator is displayed in an inside of an icon according to an exemplary embodiment of the present invention.

In FIG. 3, a diagram such as a small arrow in a circle is displayed outside of the icon as an example of the sub menu indicator. The sub menu indicator may be displayed when the icon includes the sub menu, such that the user may recognize that the sub menu is able to be selected when the sub menu indicator is displayed. As described above, a shape, a direction, and a position of the sub menu indicator are not limited. However, it is preferable to have a shape from which it is easy to intuit a gesture for selecting the sub menu in view of a user. That is, the shape and position of the sub menu indicator are preferably provided so as to assist a user in intuitively using the sub menu.

A sub menu indicator 315 of an icon 310 is an arrow indicating a downward direction, such that the user may intuit a sweep gesture in downward direction from the shape and direction of the arrow after selecting the icon. A sub menu indicator 335 of an icon 330 is an arrow indicating a right direction, and thus, the user may intuit a sweep gesture to the right direction after selecting the icon. A sub menu indicator 355 of an icon 350 is a double arrow indicating the down direction, such that the user may intuit a double-tap operation, and a sub menu indicator 375 of an icon 370 is a two-way double arrow, such that the user may intuit the gesture spreading the multi touch points.

As a sub menu indicator 395 of an icon 390 is a circle, a general tap operation executes the function corresponding to the icon, such that the user may intuit the gesture such as a long tap or a long press from the sub menu indicator having a circle shape for displaying the sub menu.

However, as the sub menu indicators shown in FIG. 3 are only examples, the shape, the direction, and the position of the sub menu indicator should not be limited to the exemplary embodiment set forth herein. In addition, the user may individually set the shape, the direction, and the position of the sub menu indicator and the kind of the second input corresponding to the shape, the direction, and the position of the sub menu indicator. Therefore, when the indicator is set so that the user is unlikely to intuit the kind of the second input, the terminal may have the same effect as the effect that the sub menu locking function is set without a separate locking.

Figure 4:
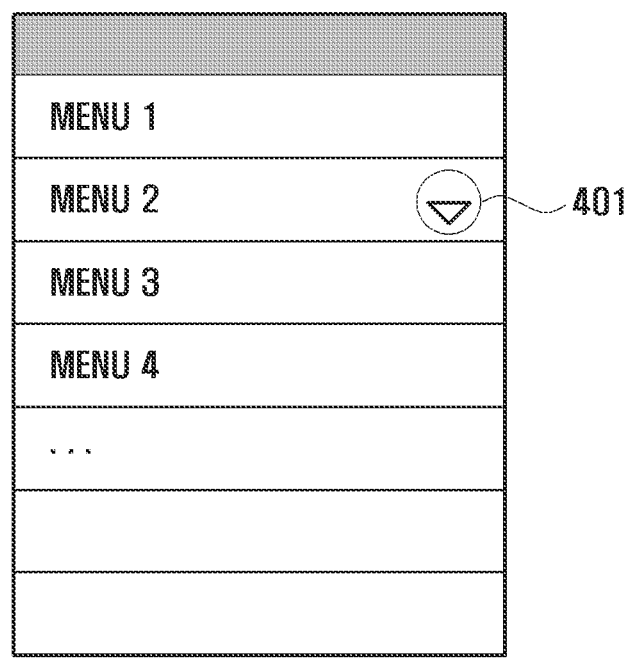
FIG. 4 is a diagram illustrating an example of a case in which a sub menu indicators are displayed in individual contents on a list according to an exemplary embodiment of the present invention.

FIG. 4 is a diagram illustrating an example of the case in which sub menu indicators are displayed in an inside of individual contents on a list according to an exemplary embodiment of the present invention.

Generally, the list is displayed on the whole screen, and when the individual contents include the sub menu, the controller may display the sub menu indicators in the inside of individual contents on a list. Referring to the FIG. 4, a sub menu indicator 401 is an arrow indicating a downward direction, such that the user may intuit a sweep gesture of downward direction from the indicator.

Figure 5:
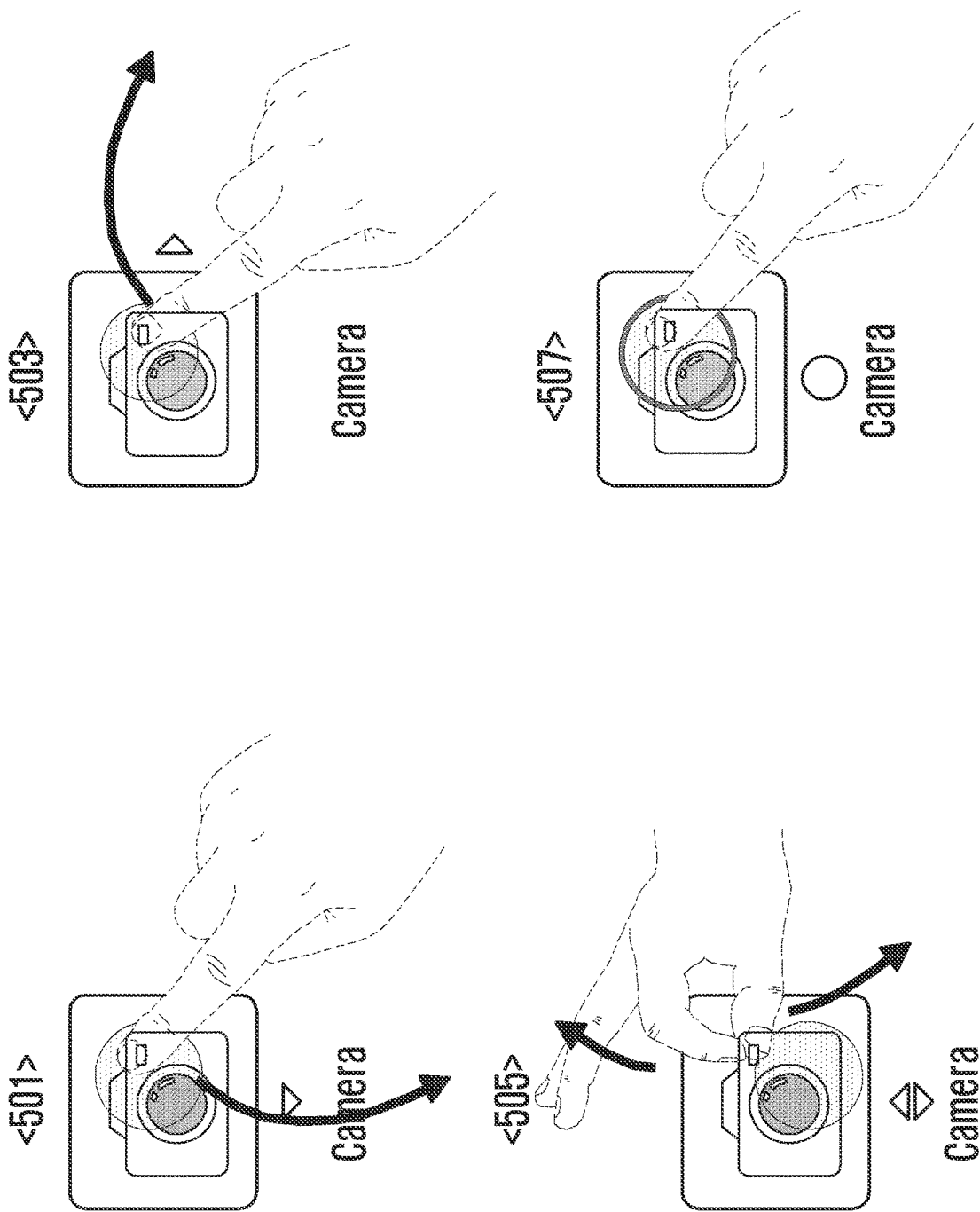
FIG. 5 is a diagram for illustrating a method for inputting a second input corresponding to a sub menu indicator according to an exemplary embodiment of the present invention.

FIG. 5 is a diagram illustrating a method for inputting a second input corresponding to a sub menu indicator according to an exemplary embodiment of the present invention.

FIG. 5 illustrates a touch gesture (the second input) for displaying the sub menu corresponding to each sub menu indicator on an item. Although the icon has the sub menu, a function corresponding to the icon of the related art is executed when touching an arbitrary point on the icon of the related art. In contrast, after inputting the first touch in an exemplary embodiment of the present invention, when a preset gesture is continuously performed for the displayed sub menu indicator, the sub menu is displayed.

FIG. 5 illustrates the examples of the case in which the gesture which can be intuited by the user is set for each sub menu indicator. In an icon 501, the user may display the sub menu by continuously performing a gesture sweeping in downward direction after inputting the first input for selecting the icon, in response to the downward pointing arrow below the icon 501. In an icon 503, the user may display the sub menu by continuously performing the gesture sweeping to the right direction after inputting the first input for selecting the icon, in response to the right pointing arrow to the right of the icon 503. In an icon 505, the user may display the sub menu by continuously performing the gesture of spreading the multi touch points in an up-and-down direction after inputting the first input for selecting the icon, in response to the arrows of up-and-down directions depicted below the icon 505. In an icon 507, the user may display the sub menu by continuously performing the long-tap or the long-press gesture after inputting the first input for selecting the icon, in response to the diagram having a circle shape depicted below the icon 507.

In the meantime, according to another exemplary embodiment of the present invention, the indicator does not indicate a gesture for displaying the sub menu but may indicate a direction in which the sub menu is displayed or deployed.

For example, in the icon 501, the indicator indicates the downward direction, which means that the sub menu of the icon is deployed in the downward direction when the touch gesture for a corresponding icon is input. As another example, in the icon 503, the indicator indicates the right direction, which means that the sub menu of the icon is deployed in the right direction when the touch gesture for a corresponding icon is input.

Figure 6A:
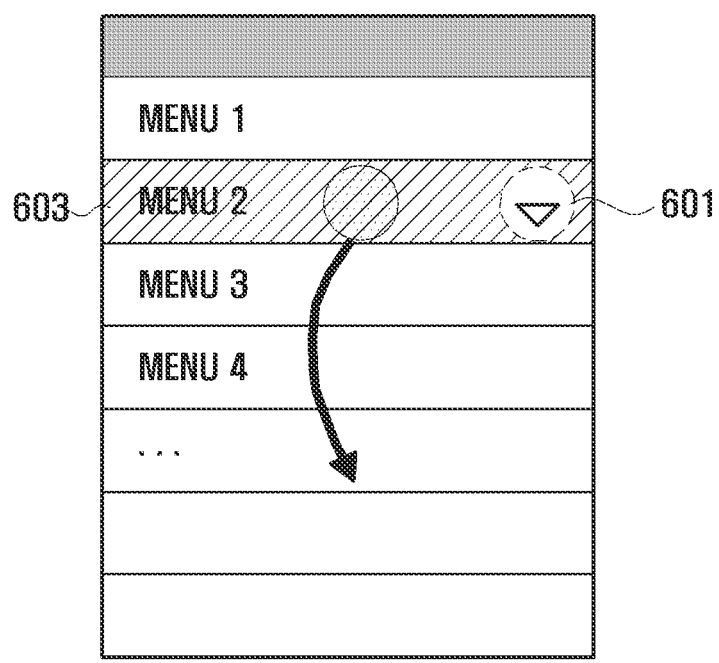
FIGS. 6A and 6B are diagrams for illustrating a method for displaying a sub menu in a case in which sub menu indicators are included in an individual contents on a list according to an exemplary embodiment of the present invention.
Figure 6B:
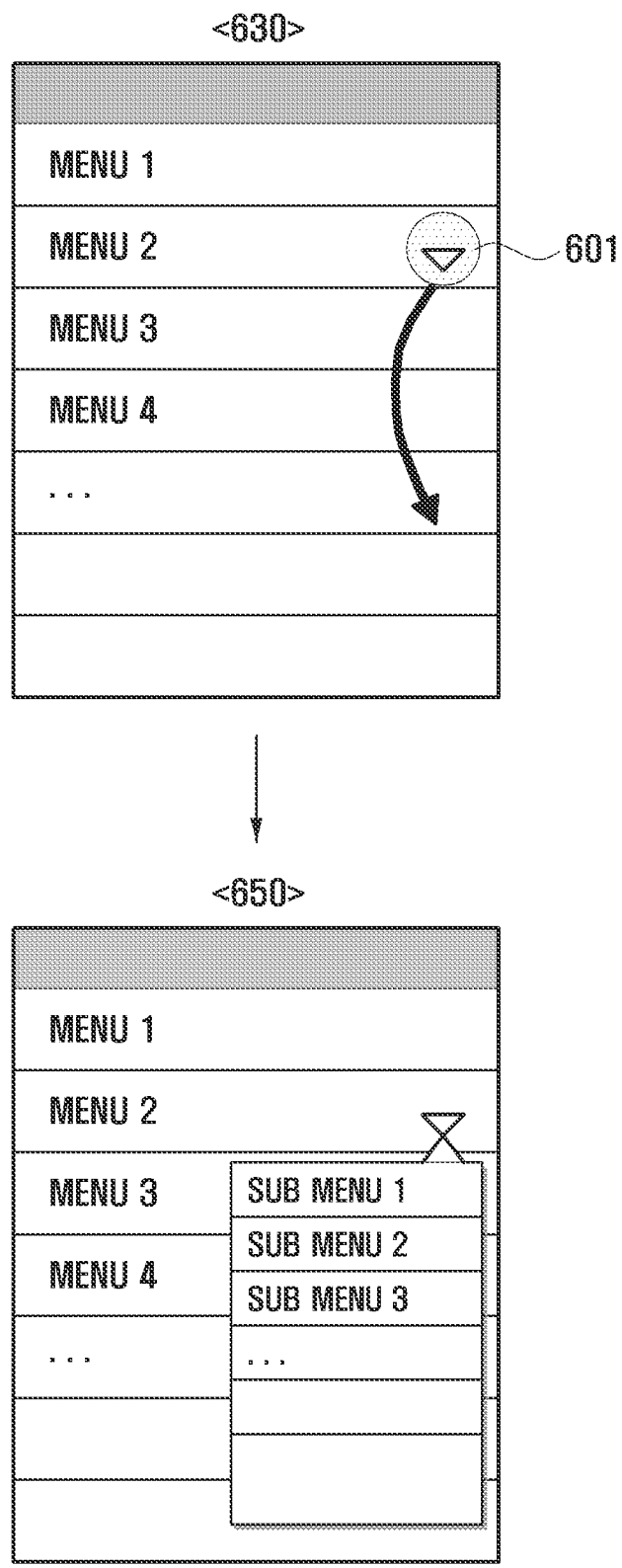

FIGS. 6A and 6B are diagrams for illustrating a method for displaying a sub menu in a case in which sub menu indicators are included in individual contents of the list, according to an exemplary embodiment of the present invention.

In FIGS. 6A and 6B, when the sub menu includes individual contents on a list, a gesture such as the sweep and the flick may be used in order to scroll through the list deviating from the range of contents displayed on the screen. That is, the input for scrolling through the list contents may be confused with the input for displaying the sub menu. Therefore, the gesture input (e.g., scrolling) specialized for the list and the gesture input for displaying the sub menu need to be distinguished from each other.

As shown in FIG. 6A, when the user touches arbitrary area on oblique line area 603, except for the preset area 601 including the sub menu indicator, among the entire area of individual content and performs the sweep operation in the downward direction, the controller may execute the scroll action.

Referring to FIG. 6B, as shown in a screen 630, when the user touches the preset area 601 including the sub menu indicator (the third input) and performs the sweep operation in the downward direction (the second input), the controller may display the sub menu as shown in a screen 650. That is, when the sub menu indicator indicating that the sub menu exists is displayed in the inside of the individual content, a selection area for displaying the sub menu is specified, thereby making it possible to distinguish between the gesture for scrolling and the gesture for displaying the sub menu.

Figure 7:
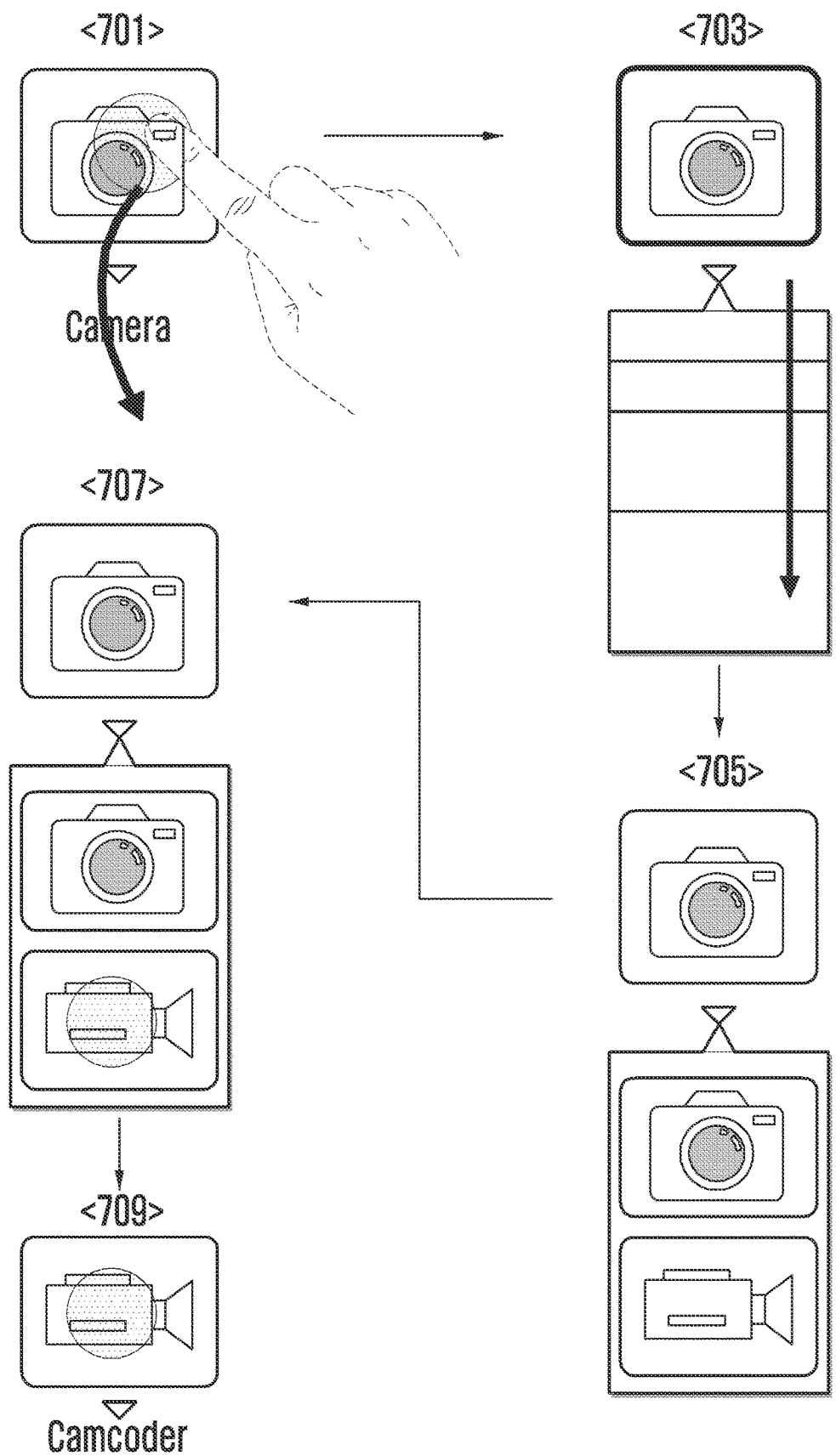
FIG. 7 is a diagram for illustrating a method for displaying a sub menu according to an exemplary embodiment of the present invention and an example of icon switching according to a sub menu selection.

FIG. 7 is a diagram illustrating a method for displaying a sub menu according to an exemplary embodiment of the present invention and an example of icon switching according to sub menu selection.

In FIG. 7, a camera icon includes the sub menu capable of alternatively selecting the picture camera and the video recording function, i.e., a camcorder. In this case, the controller may display an arrow in a down direction below the icon as shown in a diagram 701. When the user performs the sweep operation in the down direction in response to the sub menu indicator after the icon is selected, the sub menu may be displayed to spread while being slid in a sweeping direction as shown in a diagram 703. In addition, the icon may be displayed with focus using thick edges in order to indicate that the sub menu of the icon is displayed. In a state in which the sub menu is displayed as shown in a diagram 705, when the user selects the camcorder menu as shown in a diagram 707, the controller may switch the camera icon into the camcorder icon as shown in a diagram 709. Thereafter, when the user touches the camcorder icon, the controller immediately executes the camcorder function. According to the exemplary embodiment of the present invention, the user may immediately change the camera icon into the camcorder icon without entering into the camera menu and perform other functions without the screen switching.

Figure 8:
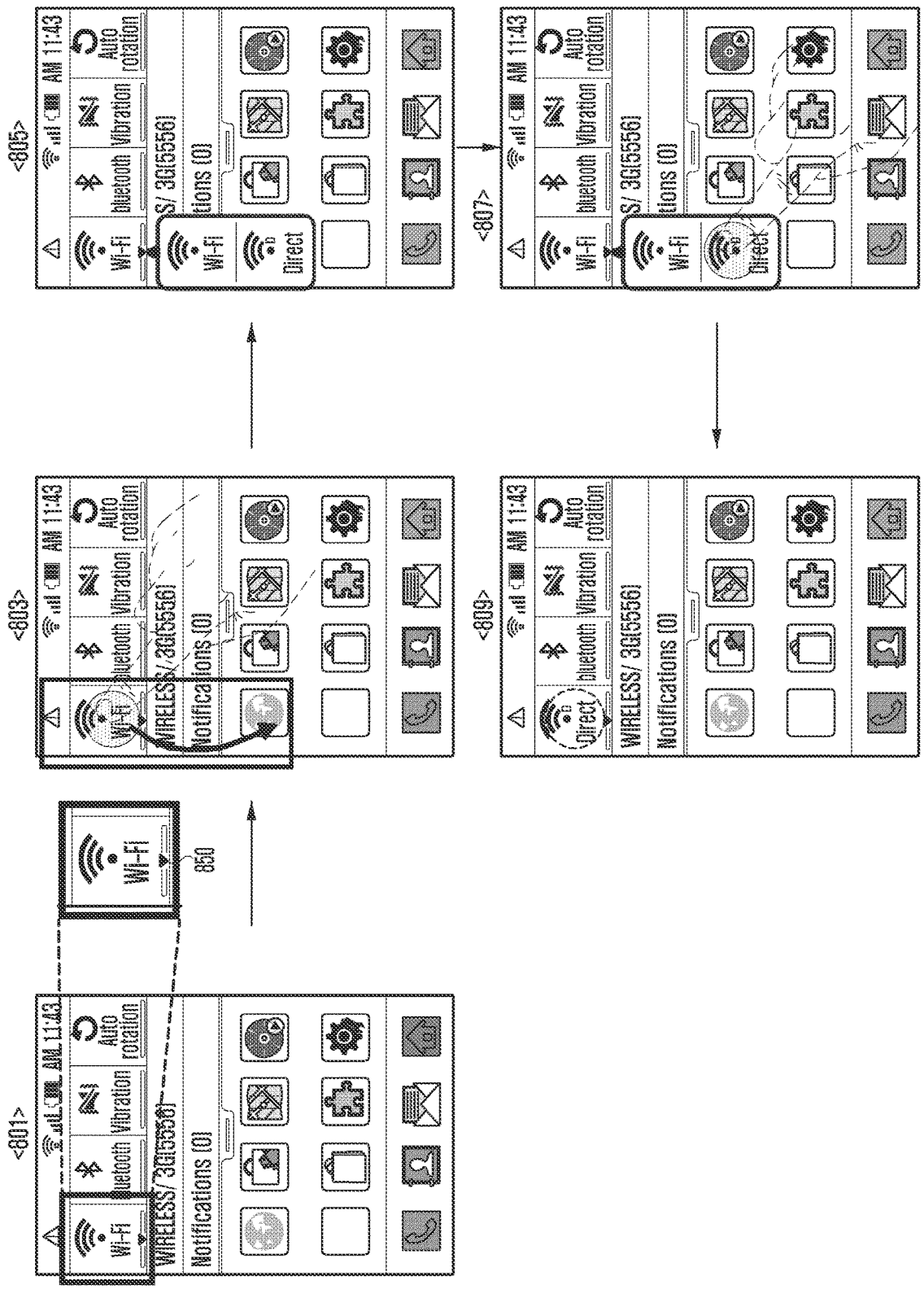
FIG. 8 is a diagram for illustrating a method for displaying a sub menu according to an exemplary embodiment of the present invention and another example of icon switching according to a sub menu selection.

FIG. 8 is a diagram illustrating a method for displaying a sub menu according to an exemplary embodiment of the present invention and another example of icon switching according to sub menu selection.

A quick panel is a user interface used in common in various mobile OSs. Generally, the sub menus corresponding to the function that is most used are included in the quick panel. However, the quick panel of the related art may display only about four or five icons, due to a constraint of space.

There is a Wi-Fi icon, which is a representative icon displayed in the quick panel. The Wi-Fi icon displayed in a screen 801 turns on or turns off a wireless communication connection to perform the function for displaying the state information. Meanwhile, in accordance with the various communication schemes, it has been frequently used by various schemes such as BLUETOOTH, Wi-Fi direct, and Near Field Communication (NFC) as well as Wi-Fi. However, entry into a separate menu is required in the related art in order to change the communication scheme, due to the constraint of space.

According to an exemplary embodiment of the present invention, the communication scheme may be changed through a simple operation in the quick panel without the complicated screen switching. As shown in FIG. 8, the Wi-Fi function may include the Wi-Fi Direct, which is an expansion function of the Wi-Fi as the sub menu. As a result, the sub menu indicator such as an icon 850 is displayed in the Wi-Fi icon, as shown in diagram 801. The user may turn on and turn off the Wi-Fi by performing the tap operation. As shown in a diagram 803, when the user selects the icon to sweep in the arrow direction, the Wi-Fi and the Wi-Fi Direct, which are the sub menu entries, are displayed in the icon type as shown in a diagram 805. At this time, when the user selects the Wi-Fi Direct as shown in diagram 807, the controller switches the icon displayed in the quick pad into the Wi-Fi Direct icon as shown in diagram 809. As a result, the user may turn on and turn off the Wi-Fi Direct by only the simple tap operation without the menu entry through the screen switching.

Figure 9:
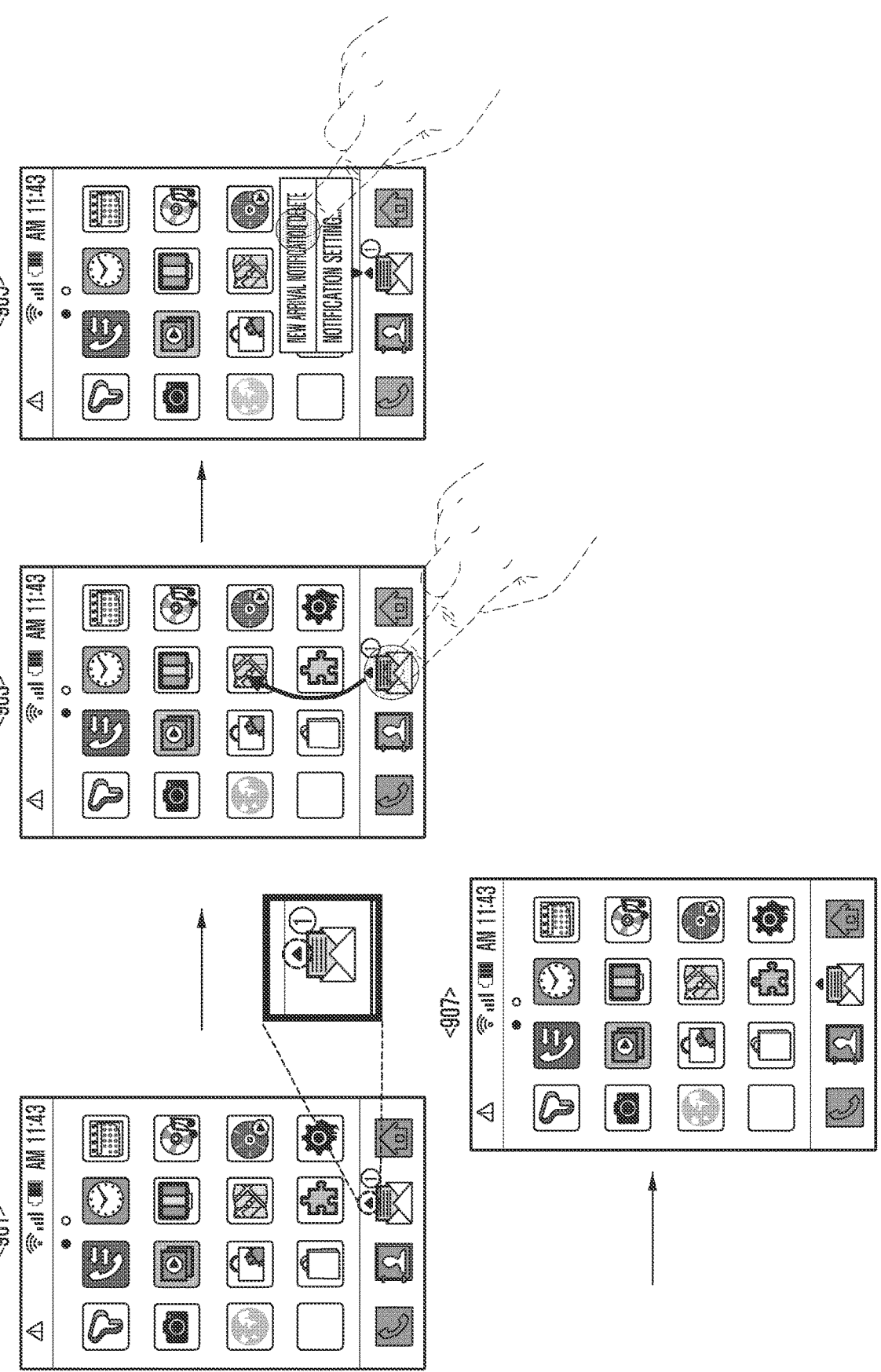
FIG. 9 is a diagram for illustrating a method for displaying a sub menu according to an exemplary embodiment of the present invention and another example of icon switching according to a sub menu selection.

FIG. 9 is a diagram illustrating a method for displaying a sub menu according to an exemplary embodiment of the present invention and another example of icon switching according to a sub menu selection.

Referring to FIG. 9, according to an exemplary embodiment of the present invention, when a new message is received, a method for the removing of a new arrival message notification displayed on the message box icon of a home screen will be described. In FIG. 9, the message box icon includes the sub menus such as a new arrival notification delete function and a notification setting function. Therefore, the message box icon is displayed together with the sub menu indicator as shown in screen 901. As shown in screen 903, when a first input selecting the message box icon and a second input sweeping in the arrow direction are received after the first input, the controller displays the sub menu as shown in screen 905. When the user selects the new arrival notification delete function, the controller reflects the executed result and switches the icon displayed on the home screen into an icon in which the new arrival message notification display is removed as shown in screen 907.

According to the existing user interface of the related art, in order to delete the new arrival message notification display, the message must be separately confirmed in the message box. However, the method of an exemplary embodiment of the present invention may remove the new arrival message notification display on the message box icon without entering a corresponding menu.

Figure 10:
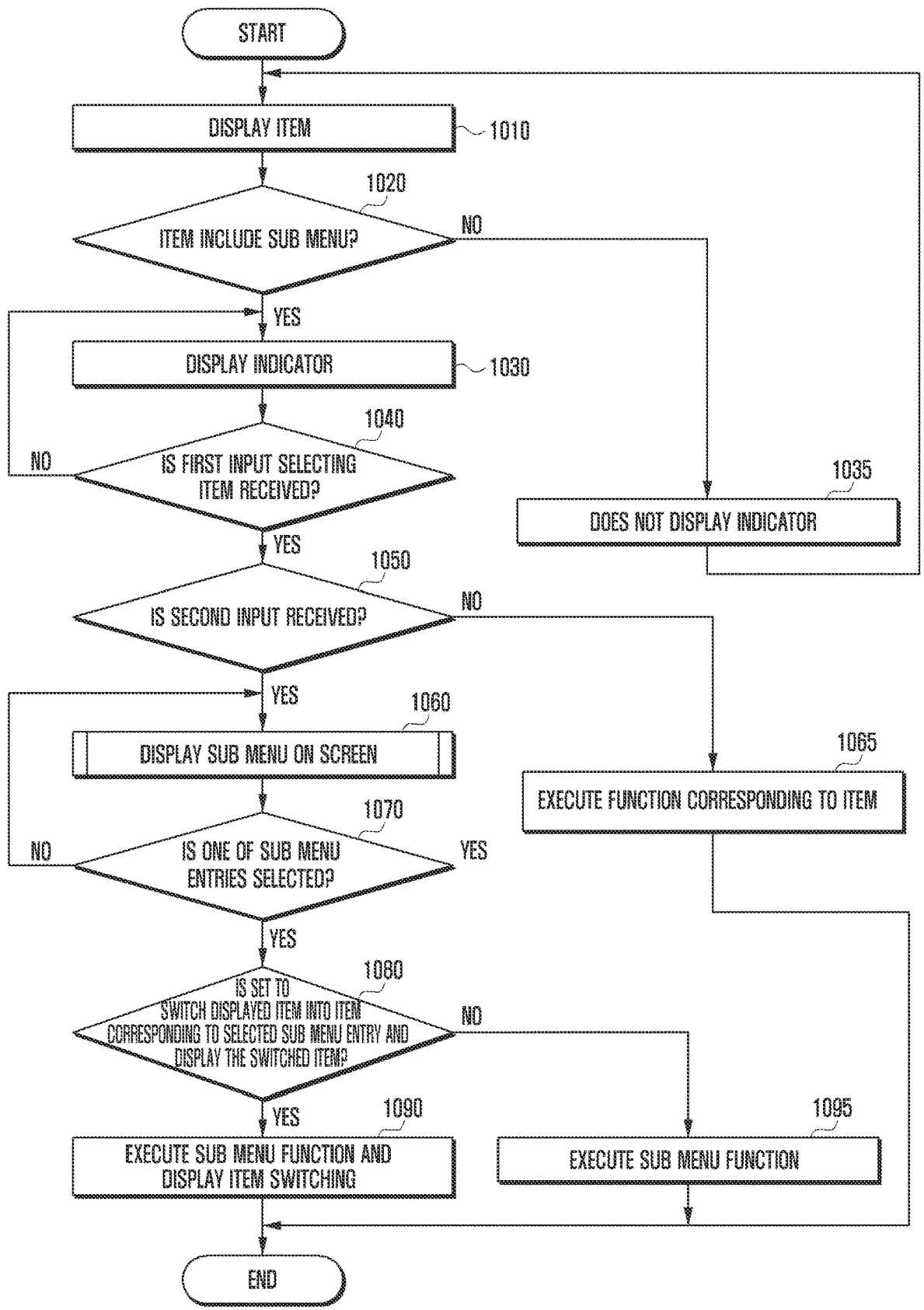
FIG. 10 is a flowchart for illustrating a method for displaying a sub menu according to an exemplary embodiment of the present invention.

FIG. 10 is a flowchart illustrating a method for displaying a sub menu according to an exemplary embodiment of the present invention.

First, the controller displays an item corresponding to an arbitrary function in step 1010. As described above, the item may include the icon or individual contents on a list. The controller determines whether the item includes at least one sub menu associated with the item in step 1020. As a result, when the item includes the sub menu, the sub menu indicator is displayed in the outside or the inside of the item in step 1030. When the item does not include the sub menu, the sub menu indicator may not be separately displayed in step 1035. As another example, even when the item does not include the sub menu, the sub menu indicator may be displayed. However, in this case, it is preferable that the sub menu indicator has a shape which indicates that the item does not include the sub menu.

Hereinafter, it is illustrated that the controller determines that the item includes the sub menu, and displays the sub menu indicator for the item.

When the first input selecting the item on which the sub menu indicator is displayed is received in step 1040, and the second input for displaying the sub menu is received continuously after the first input in step 1050, the controller displays the sub menu in step 1060. Here, the first input may be a touch input and the second input may be at least one of a sweep, a drag, a tap, a double tap, a long tap, a press, and a gesture spreading multi touch points from each other. There are various kinds of possible second input for displaying the sub menu. However, only when the gesture corresponding to the sub menu indicator displayed on the item is inputted, the controller 140 recognizes the gesture as the second input to display the sub menu.

The shape of the sub menu indicator indicates the kind of second input, and the direction in which the sub menu indicator points indicates a moving direction of the second input. A detailed description for the gesture of the second input corresponding to the shape and direction of the sub menu indicator was described above with regard to FIG. 3. In addition, although not shown, when the sub menu is displayed, the controller generates at least one of a sound, a vibration, and a light, to alert the user to the display of the sub menu, and the sub menu may be displayed in a type such as a text format, an icon format, a picture format, an animation clip format, or a video format.

When the second input for displaying the sub menu is not continuously received after receiving the first input at step 1040, the controller may execute a function corresponding to the sub menu selected by the first input in step 1065. Next, when one of the sub menu entries is selected in step 1070, the controller determines whether the displayed sub menu is set to switch into a sub menu corresponding to the selected sub menu entry to display in step 1080. In this case, the controller executes the sub menu function and switches the sub menu into the sub menu corresponding to the selected sub menu entry to display in step 1090. In case the sub menu is not set to switch and display, the controller executes the sub menu function in step 1095, and does not reflect it on the displayed sub menu.

Figure 11:
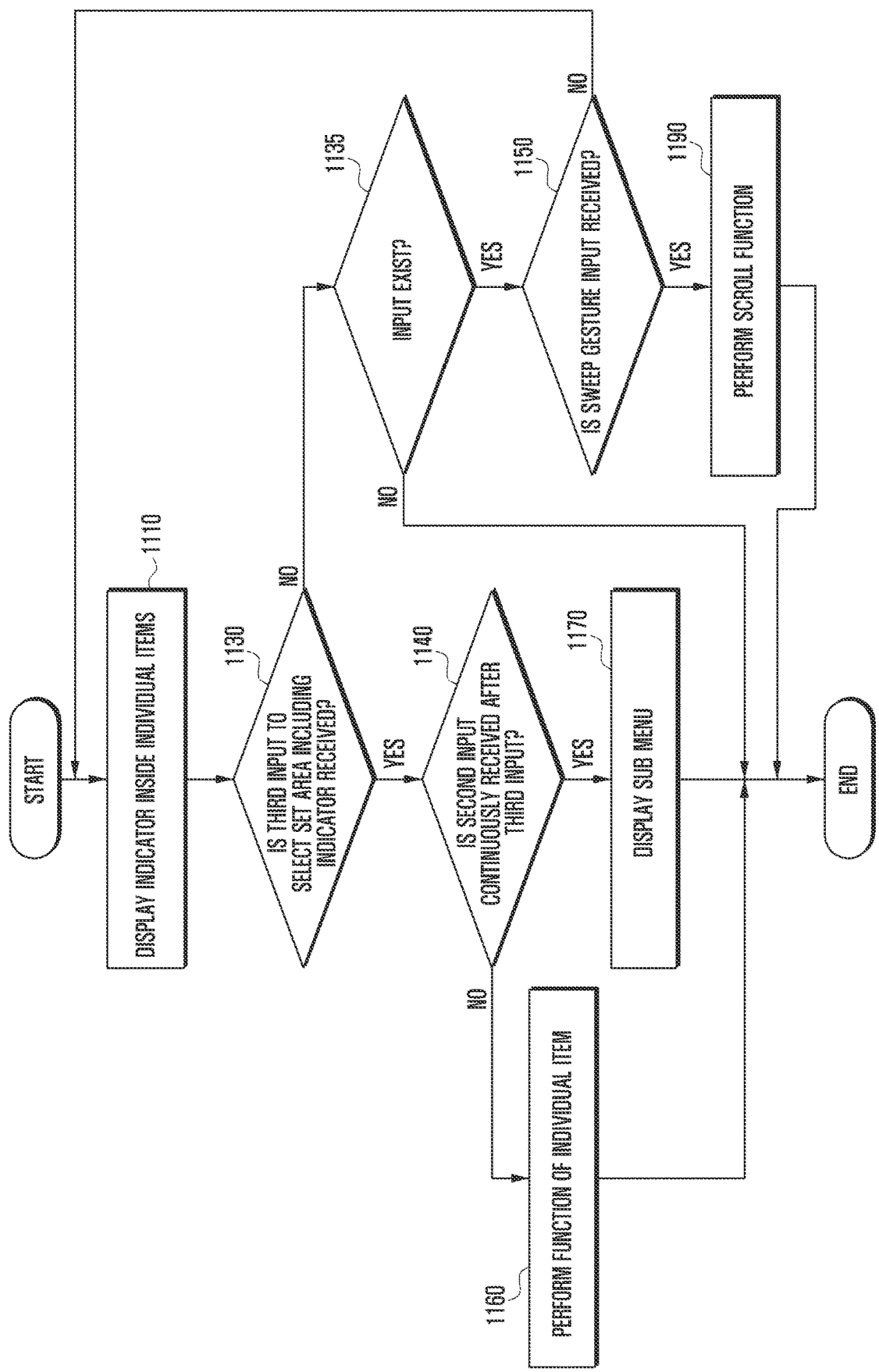
FIG. 11 is a flowchart for illustrating an example of a method for displaying a sub menu in a case in which sub menus are individual contents on a list according to an exemplary embodiment of the present invention.

FIG. 11 is a flowchart illustrating an example of a method for displaying a sub menu when sub menus are individual contents on a list according to an exemplary embodiment of the present invention.

As described above, the item may include the icon or the individual contents on the list. Here, when the item is individual contents on the list, the gesture such as the sweep and the flick may be used in order to scroll through the list deviating from the range displayed on the screen. Therefore, a gesture input specialized for the list (e.g., scrolling) and a similar gesture input for displaying the sub menu need to be distinguished from each other. Hereinafter, a detailed method for distinguishing the two inputs will be described.

First, the controller may display the sub menu indicator in the inside of the individual contents, when the item is individual contents on the list in step 1110. When a third input for selecting a preset area including the sub menu indicator is received in step 1130 and the second input is continuously received after the third input in step 1140, the controller displays the sub menu in step 1170. Although the third input is received, if the second input is not continuously received after the third input at step 1140, the controller executes the function of individual contents in step 1160. When the third input is not received in spite that the input exists, that is, the sub menu area except for the preset area is selected, and an input exists at step 1135, the controller may execute the scroll function when the sweep gesture input is the input received at step 1150 in step 1190. In other words, when the preset area including the sub menu indicator is selected, the controller displays the sub menu in response to the continuously inputted gesture, and when a portion excluding a preset area from the sub menu is selected, the controller executes the function related to list such as the scrolling in response to the continuously inputted gesture.

Figure 12:
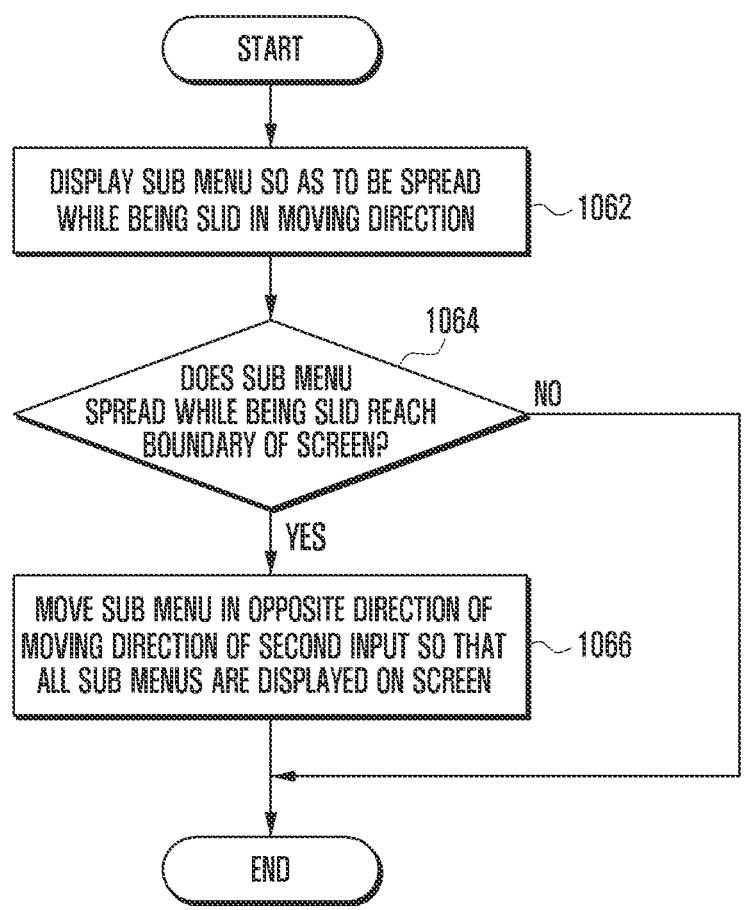
FIG. 12 is a flowchart for illustrating a step of displaying a sub menu in a method for displaying a sub menu according to an exemplary embodiment of the present invention in detail.

FIG. 12 is a flowchart illustrating a step of displaying a sub menu in a method for displaying a sub menu according to an exemplary embodiment of the present invention. In displaying the sub menu, when the second input for displaying the sub menu is received, the controller may display the sub menu so as to be spread while being slid in the moving direction of the second input in step 1062.

When the sub menu spread while being slid reaches a boundary of the screen in step 1064, the controller may move the sub menu in an opposite direction to the moving direction of the second input so that all of sub menus are displayed on a screen in step 1066. When a region from a sliding start point to the boundary of the screen is not sufficient to display all the sub menus, if the sub menus are displayed by the above-mentioned scheme, it becomes possible to obtain the same effect as the effect that the sub menu is bounced by the boundary of the screen to enter into the inside of the screen while being spread, so that a more dynamic screen can be implemented.

FIGS. 13A to 13D are diagrams illustrating a method for displaying a sub menu according to an exemplary embodiment of the present invention.

As described above, when a second input (touch gesture) is continuously sensed for an item including a sub menu after inputting a first input (touch input), a sub menu for the item is displayed. FIGS. 13A to 13D illustrate detailed examples of deploy directions in which the sub menu is displayed.

Hereinafter, an area in which the sub menu is displayed is called a sub menu display area. The size of the sub menu display area can be varied depending on the number of sub menus to be displayed or the size of each item configuring the sub menu.

Figure 13A:
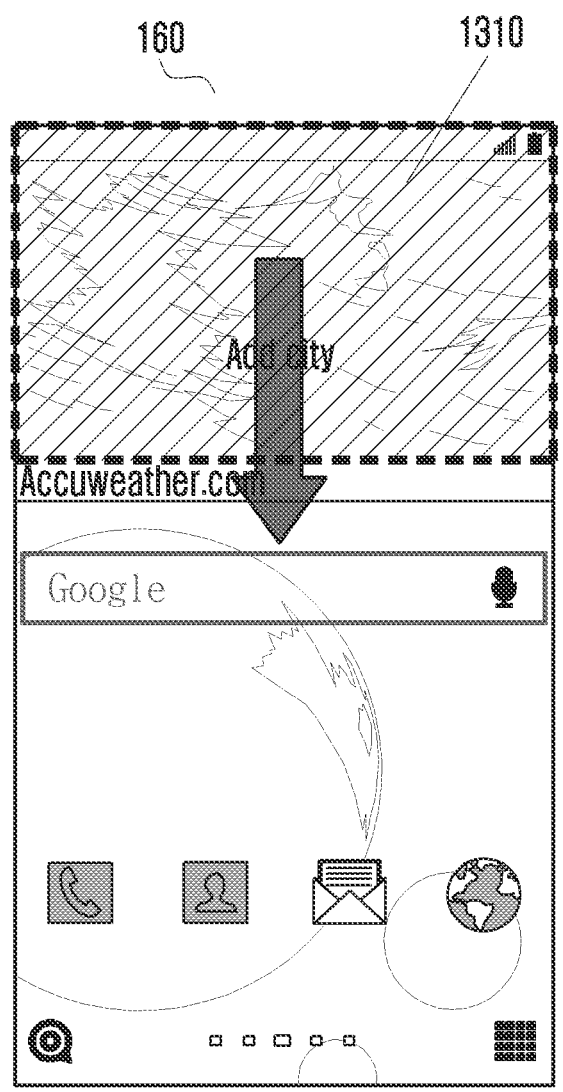
FIGS. 13A to 13D are diagrams for illustrating a method for displaying a sub menu according to an exemplary embodiment of the present invention.

FIG. 13A illustrates an example of a sub menu display area 1310 which is deployed in a direction from an upper end of a display unit 160 to a lower end according to an exemplary embodiment of the present invention.

Figure 13B:
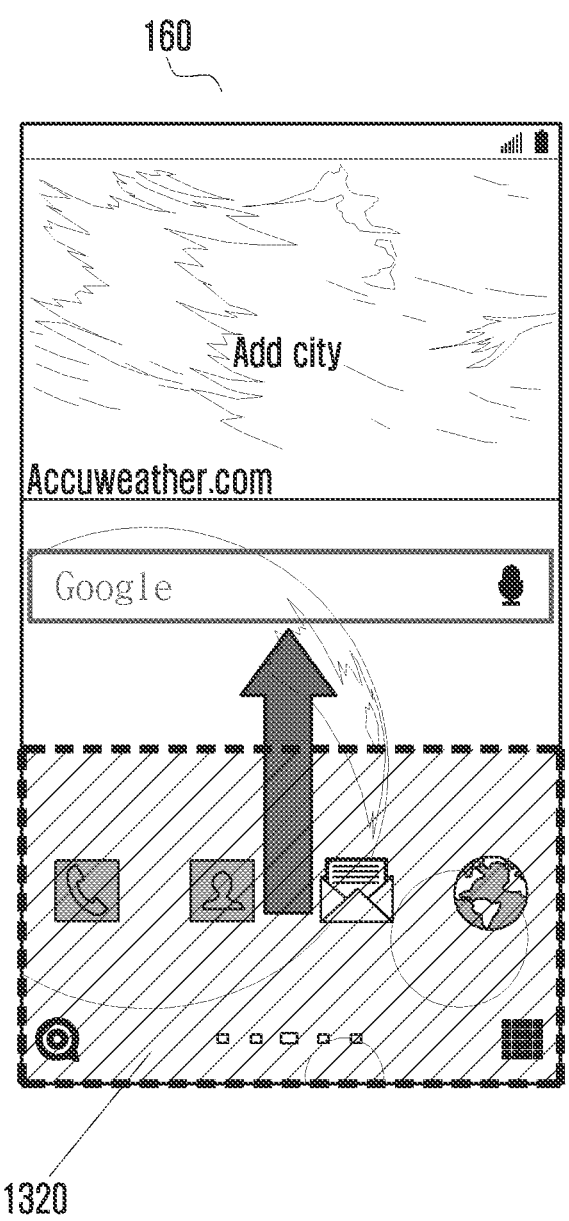

FIG. 13B illustrates an example of a sub menu display area 1320 which is deployed in a direction from a lower end of a display unit 160 to an upper end according to an exemplary embodiment of the present invention.

Figure 13C:
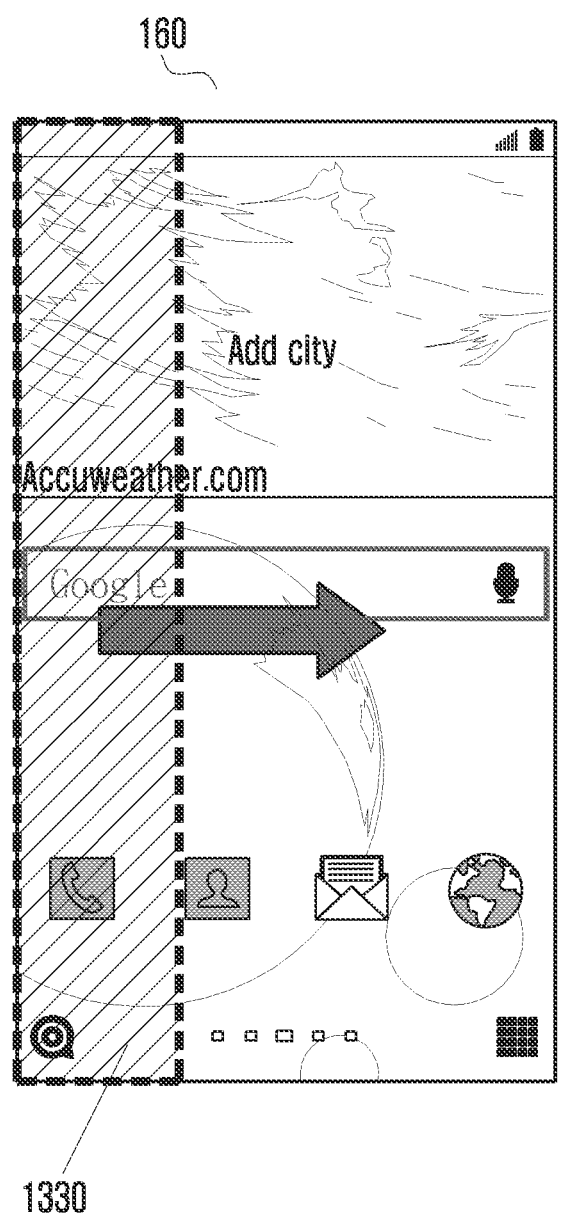

FIG. 13C illustrates an example of a sub menu display area 1330 which is deployed in a direction from a left direction of a display unit 160 to a right direction according to an exemplary embodiment of the present invention.

Figure 13D:
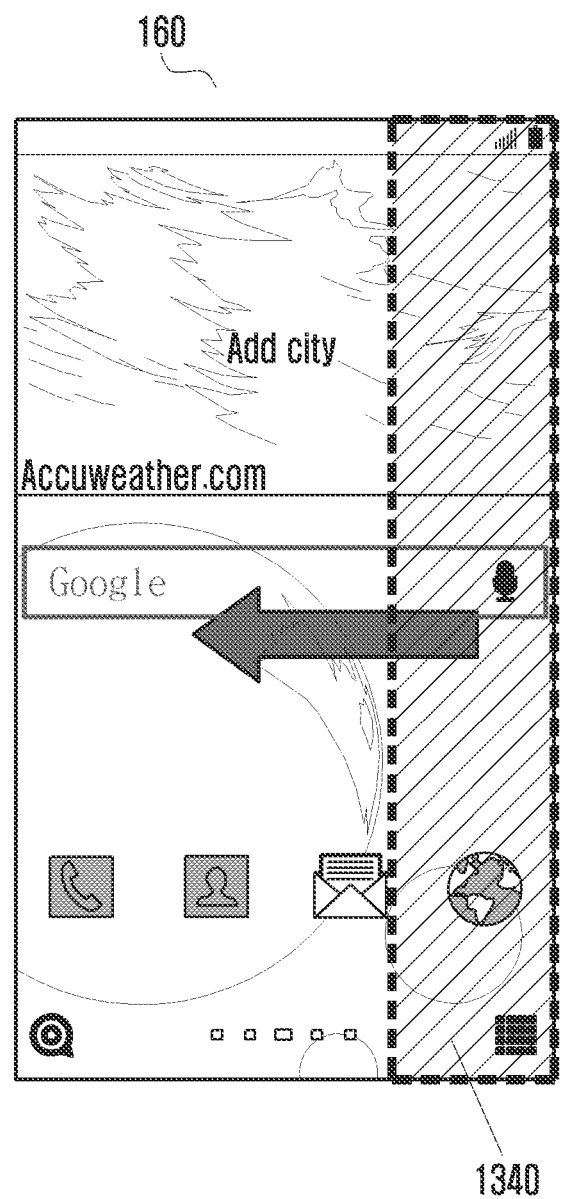

FIG. 13D illustrates an example of a sub menu display area 1340 which is deployed in a direction from a right direction of a display unit 160 to a left direction according to an exemplary embodiment of the present invention.

The direction in which the sub menu display area is deployed may be determined based on the position of item, according to a user's setting, or in an arbitrary direction.

Figure 14A:
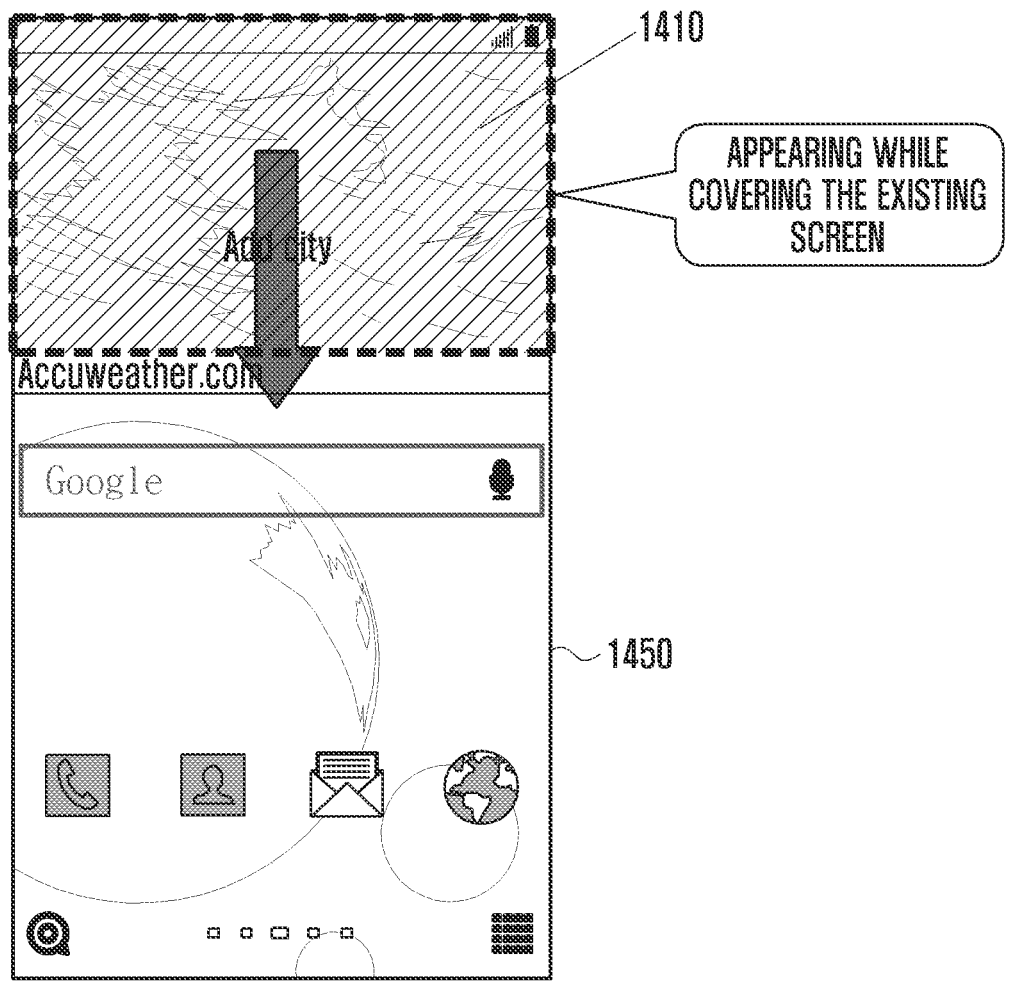
FIGS. 14 A and 14B are diagrams for illustrating an arrangement related with a previously displayed screen when a sub menu display area is deployed according to an exemplary embodiment of the present invention.
Figure 14B:
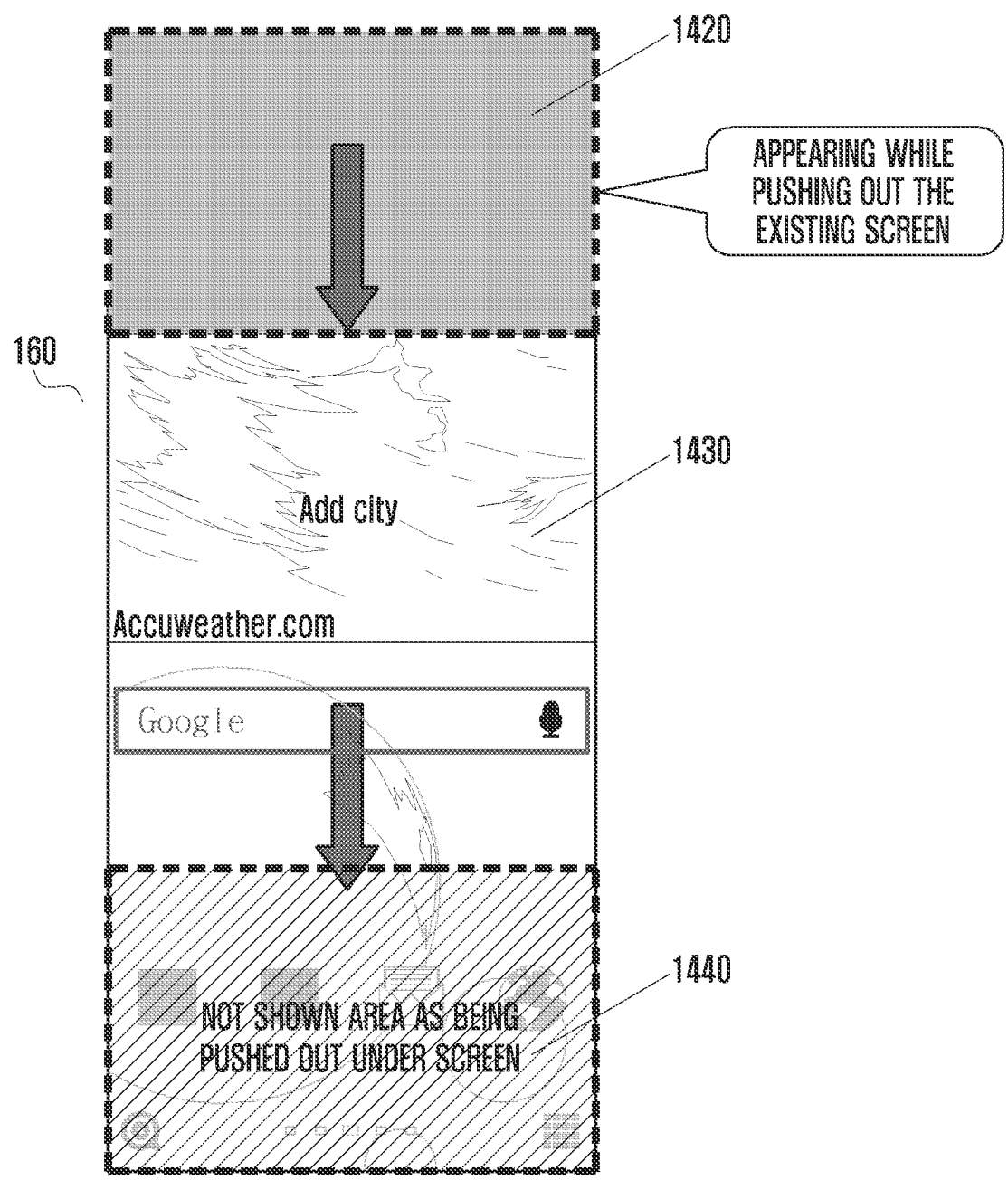

FIGS. 14A and 14B are diagrams illustrating an arrangement related with a previously displayed screen when a sub menu display area is deployed according to an exemplary embodiment of the present invention.

Firstly, FIG. 14A illustrates a method of deploying a sub menu display area 1410 which overlaps a previously displayed display screen 1450, when the sub menu display area 1410 is deployed from the upper end to the lower end. In this case, logically, the area in which the sub menu display area 1410 is displayed has a shape where the sub menu display area 1410 overlaps the display screen 1450, which can be processed separately by a different layer.

FIG. 14B illustrates a method of deploying a sub menu display area 1410 which pushes out a previously displayed display screen 1430, when the sub menu display area 1420 is deployed from the upper end to the lower end. That is, the top portion of the display screen 1430 before the sub menu display area 1420 is deployed moves to a position close to the bottom portion of the sub menu display area 1420 as the sub menu display area 1420 is deployed downwards.

In this case, depending on the size of the sub-menu display area 1420, an area 1440 of the display screen 1430 can be pushed out of the area of the display unit 160. According to an exemplary embodiment of the present invention, the area 1440 pushed out of the area of the display unit 160 may not be displayed on the display unit 160. In addition, according to another exemplary embodiment of the present invention, the size of the display screen 1430 may be reduced with a given ratio so that an area which is pushed out of the area of the display unit 160 may not be generated. A ratio with which the size of the display screen 1430 is reduced can be determined depending on the size of the sub menu display area 1420. For example, if the sub menu display area 1420 is deployed with a size that is half the size of the display unit 160, the size of the display screen 1430 can be reduced to half (50%) of the size of the previously displayed screen. The reduction of the size of the display screen 1430 may mean that the size of each item displayed on the display screen 1430 is reduced with the same ratio or a different ratio.

In FIG. 14A and FIG. 14B, it was illustrated that the sub menu display area and the display screen can be simultaneously displayed on the display unit 160.

According to an exemplary embodiment of the present invention, the sub-menu for the selected item or sub-icons is displayed on the sub menu display area 1410 and 1420, and at the same time, a content related with a function being executed on a portable terminal and an application can be displayed on the display screen 1450 and 1430.

For example, if a user is watching Digital Multimedia Broadcasting (DMB), the sub-menu for the selected item is displayed on the sub menu display area 1410 and 1420, and at the same time, the DMB can be displayed on the display screen 1450 and 1430.

Furthermore, after the sub-menu for the selected item is displayed on the sub menu display area 1410 and 1420, user can watch the DMB broadcasting through the display screen 1450 and 1430 by selecting a DMB icon on the display screen 1450 and 1430.

As described above, according to an exemplary embodiment of the present invention, the sub-menu for the selected item is displayed on the sub menu display area, and at the same time, multitasking can be performed through the display screen which is a remaining area.

Figure 15:
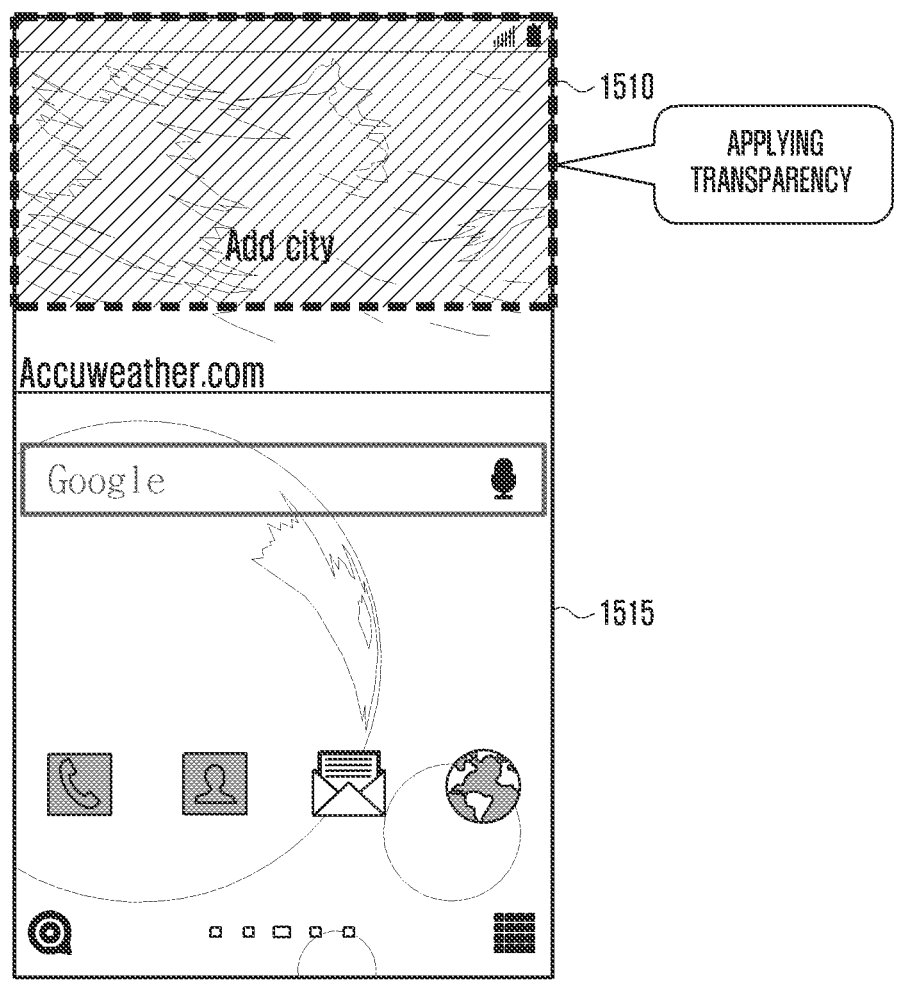
FIG. 15 is a diagram for illustrating a method for controlling a transparency of a sub menu display area when a sub menu display area is deployed while being overlapped with the previously displayed screen like FIG. 14.

FIG. 15 is a diagram for illustrating a method for controlling a transparency of a sub menu display area when a sub menu display area is deployed while overlapping the previously displayed screen of FIG. 14 according to an exemplary embodiment of the present invention.

As described in FIG. 14A, if the sub menu display area 1510 is deployed in a direction from an upper end to a lower end, it can be deployed while overlapping the previously displayed display screen 1515.

According to an exemplary embodiment of the present invention, the sub menu display area 1510 and the display screen 1515 which is located at the lower end of the sub menu display area 1510 can be simultaneously displayed by adjusting a transparency of the sub menu display area 1510.

In an exemplary embodiment of the present invention, the above mentioned transparency can be defined as a degree of showing the display screen 1515, which is located at the lower end by the sub menu display area 1510.

Accordingly, a transparency of 0% can be defined in such a manner that the sub menu display area 1510 does not show the display screen 1515 at all. As the transparency becomes greater than 0%, the display screen 1515 located at the lower end becomes more distinctly shown, depending on the ratio.

As shown in FIG. 15, if the sub menu display area 1510 having a transparency greater than 0% overlaps the display area 1515, sub-menus that are included in the sub menu display area 1510 and all of the contents that were displayed in the display area 1515 can be displayed concurrently.

Figure 16:
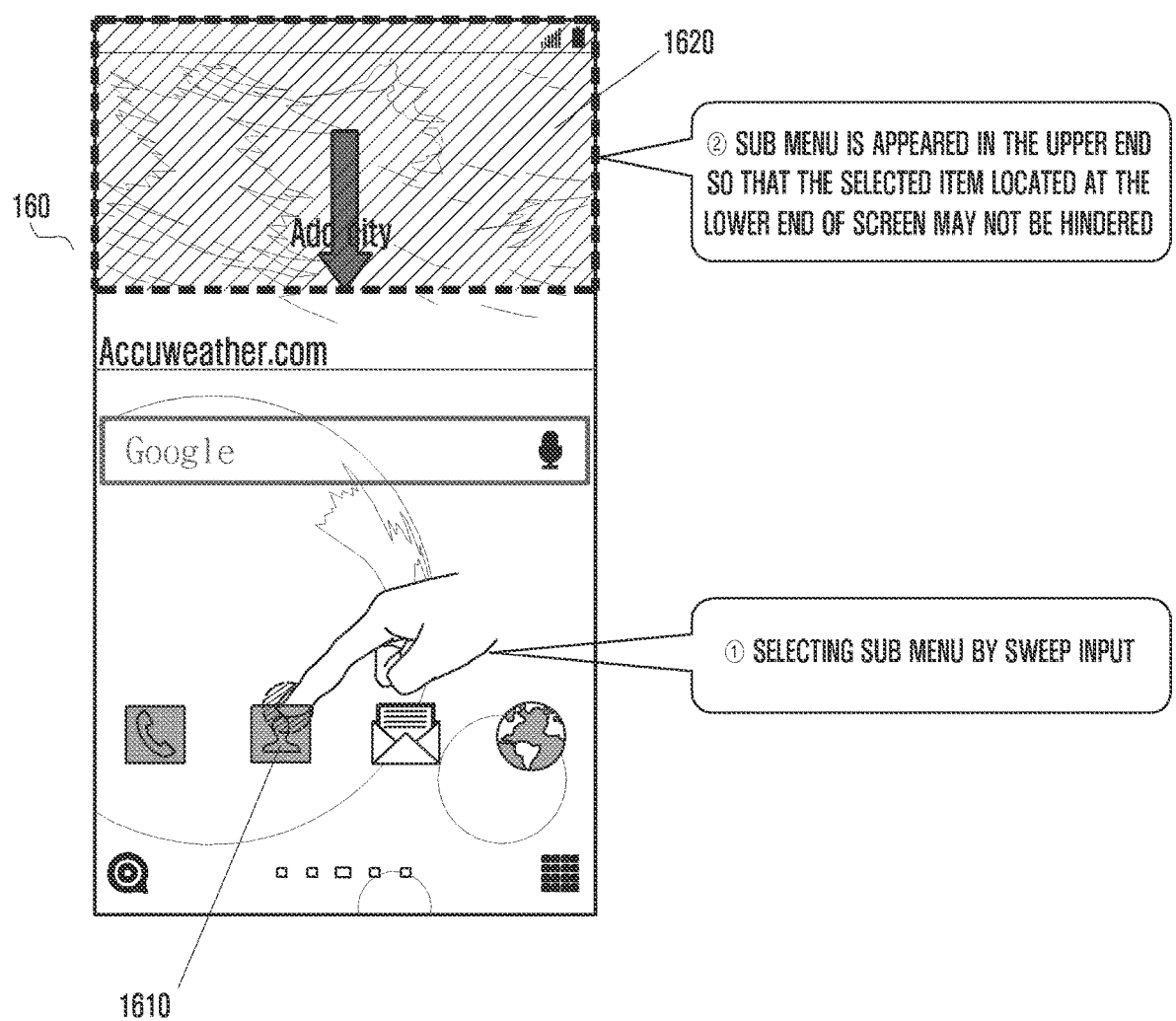
FIG. 16 is a diagram for illustrating a method for determining a display or deployed direction of sub menu display area based on a position of item according to an exemplary embodiment of the present invention.

FIG. 16 is a diagram for illustrating a method for determining a display or a deployed direction of sub menu display area based on a position of an item according to an exemplary embodiment of the present invention.

Referring to FIG. 16, an item that includes the sub-menu is a contact address item 1610, and the contact address item 1610 is located at a lower portion of the display unit 160. In this case, when a user's touch input for displaying the sub-menu of the contact address item 1610 and a touch gesture consecutive to the touch input are sensed, the sub menu display area 1620 is displayed or deployed based on the position of the contact address item 1610. That is, since the contact address item 1610 is located at a lower portion of the display unit 160, the sub menu display area 1620 can be deployed from the upper end to the lower end so as not to overlap the contact address item 1610.

In FIG. 16, an example of the sub menu display area 1620 deploying from the upper end to the lower end is illustrated, but the present invention is not limited thereto. For example, since the contact address item 1610 is located at a left side of the display unit 160, according to another exemplary embodiment of the present invention, the sub menu display area 1620 may be deployed from a right to left direction. That is, the sub menu display area may be generally configured to deploy from a distant border of the display unit 160 towards an item, so as to not overlap the item.

FIGS. 17A to 17D are diagrams illustrating a method for continuously displaying a specific item, a sub menu for a specific item, and a second sub menu for a sub menu for a specific item, according to an exemplary embodiment of the present invention.

Firstly, FIG. 17A will be described. When a touch input for a specific item, for example, a message item 1710, is generated, and then a touch gesture (e.g., a sweep) consecutive to the touch input is generated, according to an exemplary embodiment of the present invention, a first sub menu display area 1720 can be deployed and displayed from the upper end to the lower end.

In this case, at least one sub menu item for the message item 1710 can be displayed in the first sub menu display area 1720, and each sub menu can further include its own second sub menu.

Here, a touch input is generated again and a touch gesture (e.g., a sweep) consecutive to the touch input is generated with respect to a first sub menu 1730 displayed in the first sub menu display area 1720, a second sub menu display area 1740 in which second sub menus for the first sub menu are to be displayed can be displayed, being adjacent or close to the lower portion of the first sub menu display area 1720. At least one sub menu for the first sub menu can be displayed on the second sub menu display area 1740.

Likewise, if a touch input is generated again and a touch gesture (e.g., a sweep) consecutive to the touch input is generated with respect to a second sub menu 1750 displayed in the second sub menu display area 1740, a third sub menu display area 1760 can be displayed in which sub menus for the second sub menu 1750 are to be displayed, being adjacent or close to the lower portion of the second sub menu display area 1740.

According to an exemplary embodiment of the present invention, in accordance with the above mentioned method, a sub menu for a specific item, and a second sub menu for the sub-menu can be continuously displayed. Although there is no technical limitation to how many levels of sub menus can be deployed and displayed in this manner, there is a practical limitation in the limited amount of available screen space in which to display the various sub menus.

Figure 17A:
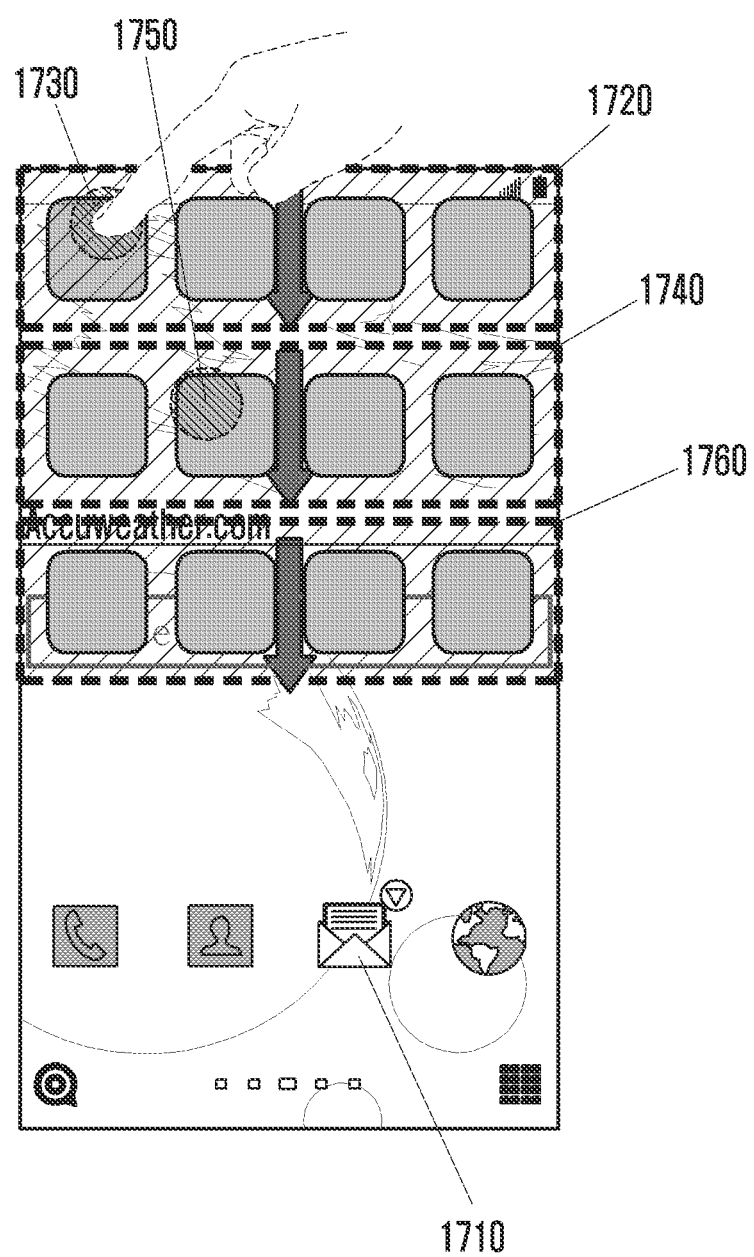
FIGS. 17A to 17D are diagrams for illustrating a method for continuously displaying a specific item, a sub menu for a specific item, and a sub menu for a sub menu for a specific item according to an exemplary embodiment of the present invention.

FIG. 17A illustrates that the sub menu display area is displayed and deployed from the upper end to the lower end. On the other hand, FIG. 17B illustrates a similar exemplary embodiment in which the sub menu display area is displayed and deployed from the lower end to the upper end.

Figure 17B:
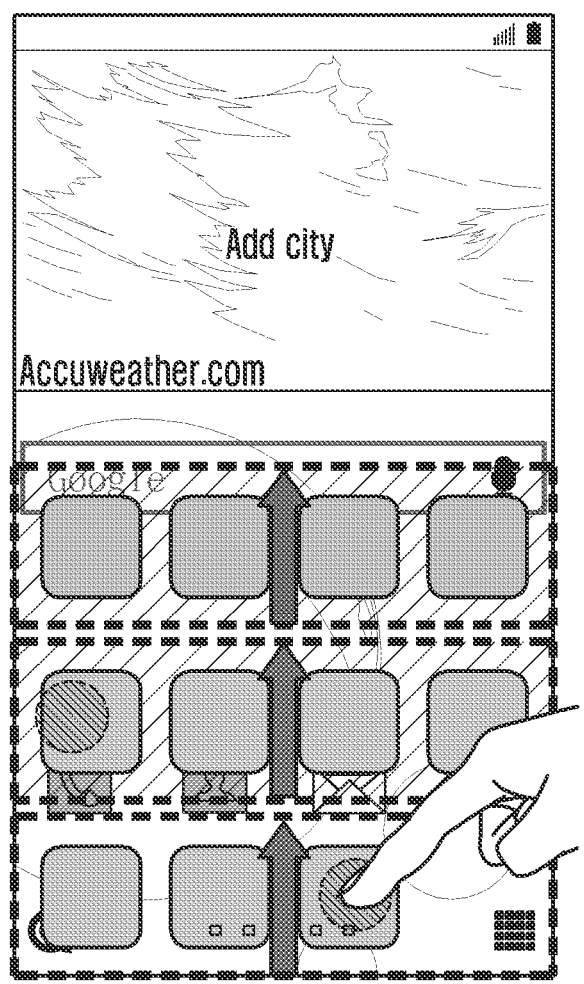
Figure 17C:
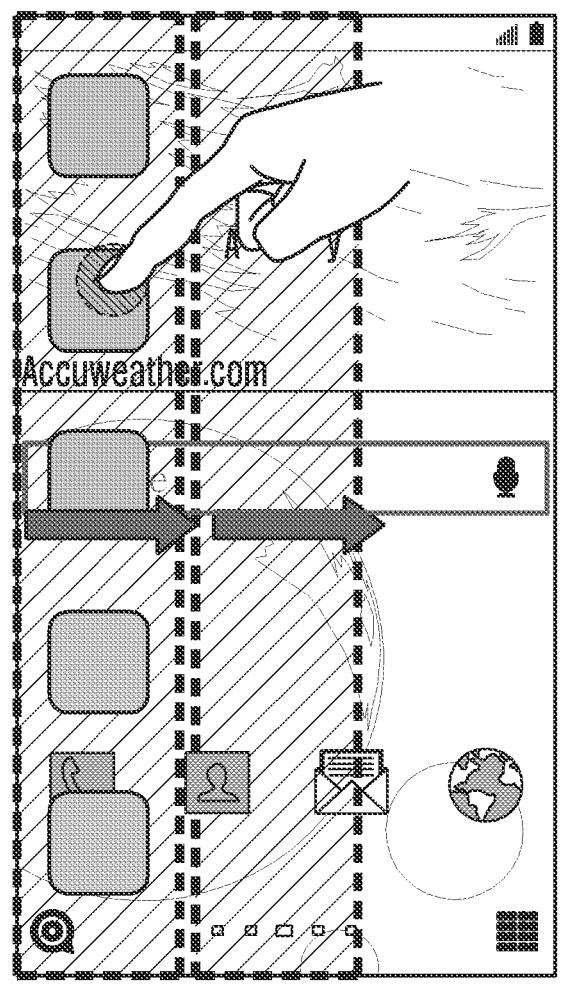
Figure 17D:
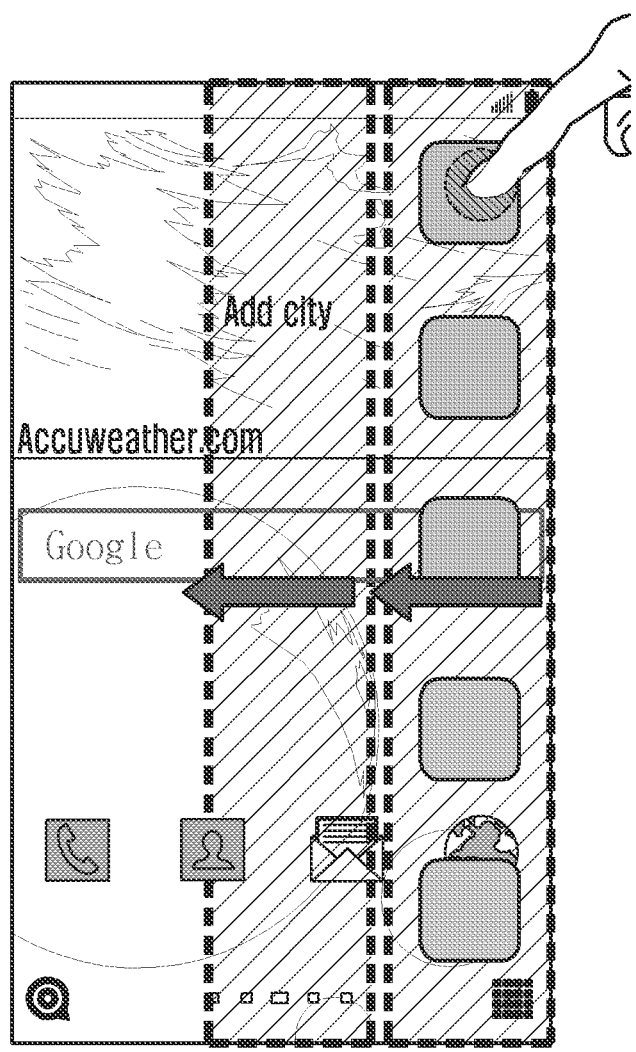

Furthermore, FIG. 17C illustrates an exemplary embodiment where the sub menu display area is displayed and deployed from a left side to a right side, and FIG. 17D illustrates an exemplary embodiment where the sub menu display area is displayed and deployed from a right side to a left side.

The basic principle of the method of continuous deployment of sub menu display area illustrated in FIG. 17A can be identically applied to the exemplary embodiments depicted in FIGS. 17B to 17D, and, accordingly, a detailed description thereof will be omitted.

Figure 18A:
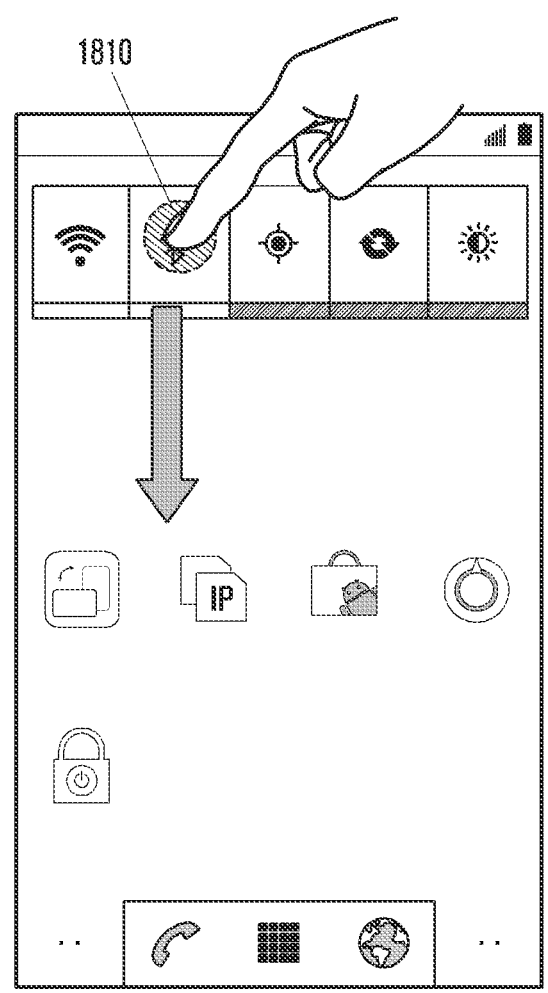
FIGS. 18A to 18C are diagrams for illustrating a method for displaying an item according to a touch gesture input for displaying a sub menu for a specific item according to an exemplary embodiment of the present invention.
Figure 18B:
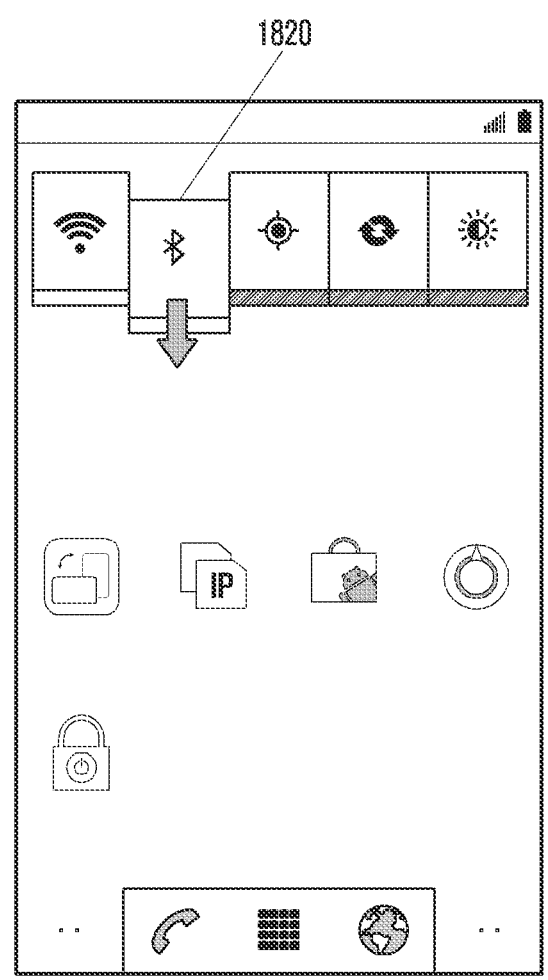
Figure 18C:
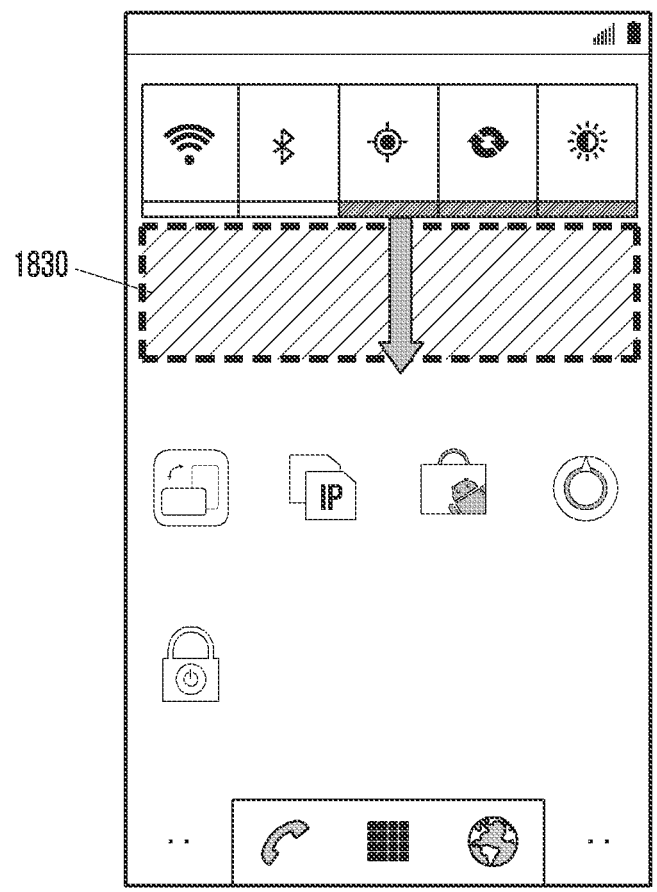

FIGS. 18A to 18C are diagrams illustrating a method for displaying an item according to a touch gesture input for displaying a sub menu for a specific item according to an exemplary embodiment of the present invention.

FIG. 18A illustrates a process of inputting a touch gesture (e.g., a sweep) for displaying a sub menu for a specific item 1810.

When the touch gesture is input, as shown in FIG. 18B, an item 1810 that received the touch gesture or an area 1820 allocated to the item can be returned to its original position after moving a set distance in a touch gesture direction. Then, as shown in FIG. 18C, a sub menu display area 1830 is deployed in response to the direction of the touch gesture, and a sub menu for the item 1810 can be displayed on the sub menu display area 1830.

Thus, if a visual effect when moving the item or an area allocated to the item is applied, a user can easily check the reaction for the sub menu input.

As set forth above, according to exemplary embodiments of the present invention, a related item, i.e., a sub menu, of a specific item can be found without requiring screen switching by using a sequentially inputted touch gesture after a touch input when the specific item includes the related item.

Further, according to an exemplary embodiment of the present invention, when an arbitrary item includes a related item, i.e., a sub menu, the related item indicator is displayed, such that the user may intuitively understand how to perform a touch gesture corresponding to the indicator, thereby making it possible to improve the convenience and maneuverability of a user interface.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for displaying items in a display of a terminal comprising a touch screen, the method comprising:
    displaying a plurality of items;
    displaying an indicator associated with a first item of the plurality of items;
    receiving a touch input selecting the first item;
    displaying a sub menu related to the first item when the touch input is determined to be of a first pressure value; and
    executing an application related to the first item from which the touch input is received when the touch input is determined to be of a second pressure value,
    wherein the sub menu is configured to overlap a portion of the display, having a transparency such that the overlapped portion of the display is visible through the sub menu.

2. The method of claim 1, wherein the displaying of the sub menu further comprises:
    displaying a sub menu display area, and
    displaying the sub menu in the sub menu display area.

3. The method of claim 2, wherein a location for the displaying of the sub menu display area is based on a position of the first item.

4. The method of claim 3, wherein the displaying of the sub menu further comprises deploying the sub menu display area in a direction towards the first item from an opposite edge of the touch screen based on a position in which the first item is displayed.

5. The method of claim 1, further comprising:
    displaying contents related to a function being executed in the terminal in an area in which the sub menu is not displayed.

6. The method of claim 1,
    wherein the first pressure value is greater than the second pressure value.

7. The method of claim 1, further comprising:
    switching the first item to a second item in the display when the second item is selected from the sub menu.

8. The method of claim 1, wherein the first item includes an icon or an individual content on a list.

9. The method of claim 1, wherein the sub menu is displayed in a pop up window.

10. The method of claim 1, wherein the sub menu includes a setting menu.

11. The method of claim 1, wherein the sub menu is displayed with at least one type of a text, an icon, a picture, an animation clip, or a video.

12. The method of claim 1,
    wherein the sub menu includes a list of functions corresponding to the first item, and
    wherein the list of functions is a predetermined list stored in a memory of the terminal.

13. The method of claim 1, further comprising:
    receiving another touch input, the other touch input comprising a drag having a moving direction,
    wherein the displaying of the sub menu further comprises displaying a sub menu display area while being slid according to the moving direction of the other touch input.

14. The method of claim 13, wherein the displaying of the sub menu further comprises moving the sub menu display area in an opposite direction to the moving direction of the other touch input so that all of the sub menu display area is displayed on the display, when the sub menu display area which is spread while being slid reaches a boundary of the display.

15. An electronic device comprising:
    a display;
    a touch screen configured to detect a touch input; and
    at least one processor configured to:
        control the display to display a plurality of items,
        control the display to display an indicator associated with a first item of the plurality of items,
        control the touch screen to receive a touch input selecting the first item,
        control the display to display a sub menu related to the first item when the touch input is determined to be of a first pressure value, and
        execute an application related to the first item from which the touch input is received when the touch input is determined to be of a second pressure value,
    wherein the sub menu is configured to overlap a portion of the display, having a transparency such that the overlapped portion of the display is visible through the sub menu.

16. The electronic device of claim 15, wherein, to display the sub menu, the at least one processor is further configured to control the display to:
    display a sub menu display area, and
    display the sub menu in the sub menu display area.

17. The electronic device of claim 16, wherein a location for the displaying of the sub menu display area is based on a position of the first item.

18. The electronic device of claim 17, wherein to display the sub menu, the at least one processor is further configured to control the display to display the sub menu display area as being deployed in a direction towards the first item from an opposite edge of the touch screen based on a position in which the first item is displayed.

19. The electronic device of claim 15, wherein the at least one processor is further configured to control the display to display contents related to a function being executed in the electronic device in an area in which the sub menu is not displayed.

20. The electronic device of claim 15,
    wherein the first pressure value is greater than the second pressure value.

21. The electronic device of claim 15, wherein the at least one processor is further configured to switch the first item to a second item in the display when the second item is selected from the sub menu.

22. The electronic device of claim 15, wherein the first item includes an icon or an individual content on a list.

23. The electronic device of claim 15, wherein the sub menu is displayed in a pop up window.

24. The electronic device of claim 15, wherein the sub menu includes a setting menu.

25. The electronic device of claim 15, wherein the at least one processor is further configured to control the display to display the sub menu with at least one type of a text, an icon, a picture, an animation clip, or a video.

26. The electronic device of claim 15, further comprising:
   a memory, configured to store a predetermined list of functions corresponding to the first item,
   wherein the sub menu includes the predetermined list of functions corresponding to the first item.

27. The electronic device of claim 15,
   wherein the touch screen is further configured to detect another touch input, the other touch input comprising a drag having a moving direction, and
   wherein, to display the sub menu, the at least one processor is further configured to control the display to display a sub menu display area while being slid according to the moving direction of the other touch input.

28. The electronic device of claim 27, wherein, to display the sub menu, the at least one processor is further configured to control the display to display the sub menu display area as moving in an opposite direction to the moving direction of the other touch input so that all of the sub menu display area is displayed on the display, when the sub menu display area which is spread while being slid reaches a boundary of a display.

* * * * *